United States Patent
Krapp et al.

(10) Patent No.: US 10,122,544 B2
(45) Date of Patent: Nov. 6, 2018

(54) N+0 REDUNDANCY IN A NETWORK ACCESS SYSTEM

(71) Applicant: ARRIS Enterprises LLC, Suwanee, GA (US)

(72) Inventors: Steven John Krapp, Naperville, IL (US); Gregory J. Cyr, Winfield, IL (US); Owen McNally, Nashua, NH (US); John Ulm, Pepperell, MA (US); Jeffrey Joseph Howe, West Chicago, IL (US); Thomas J. Cloonan, Lisle, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 58 days.

(21) Appl. No.: 15/237,063

(22) Filed: Aug. 15, 2016

(65) Prior Publication Data
US 2017/0054651 A1    Feb. 23, 2017

Related U.S. Application Data

(60) Provisional application No. 62/206,946, filed on Aug. 19, 2015.

(51) Int. Cl.
*H04L 12/40* (2006.01)

(52) U.S. Cl.
CPC .......... *H04L 12/40013* (2013.01); *H04L 2012/40273* (2013.01)

(58) Field of Classification Search
CPC ............ H04L 45/22; H04L 45/28; H04L 41/06–41/0695; H04L 12/40169; H04L 12/40176; H04L 12/40013
See application file for complete search history.

(56) References Cited

U.S. PATENT DOCUMENTS 6,839,829 B1   1/2005   Daruwalla et al.
7,958,229 B2   6/2011   Conway
(Continued)

FOREIGN PATENT DOCUMENTS

WO    02/13465 A1    2/2002
WO    2012087184 A1  6/2012
(Continued)

OTHER PUBLICATIONS

Related U.S. Appl. No. 14/837,625, filed Aug. 27, 2015.
PCT Search Report & Written Opinion, RE: Application No. PCT/US2016/047120, dated Oct. 25, 2016.

*Primary Examiner* — Paul H Masur
(74) *Attorney, Agent, or Firm* — Carol J. Ansley

(57) ABSTRACT

Particular embodiments provide an N+0 sharing scheme for networks. The N+0 sharing scheme includes no dedicated spare among a group of active elements. Each active element may provide service to a medium, which may be associated with a medium. When a failure to one of the active elements occurs, at least one of the working active elements takes the workload of the failed active element. The cost of N+0 sharing is a reduced per medium (e.g., service group) capacity during a failure. That is, some service groups may receive less bandwidth from the active element that is used in the sharing scheme to compensate for the failure. However, this may be preferable to service operators compared to the additional cost of including a spare for the group of active elements, or the complete loss of service that occurs when a failure occurs without a failure recovery scheme.

12 Claims, 39 Drawing Sheets

(56) References Cited

U.S. PATENT DOCUMENTS

| | | |
|---|---|---|
| 2007/0201380 A1 | 8/2007 | Ma et al. |
| 2008/0131124 A1* | 6/2008 | Nam .................... H04B 10/032 |
| | | 398/67 |
| 2011/0268435 A1* | 11/2011 | Mizutani ................ H04L 45/22 |
| | | 398/5 |
| 2011/0317995 A1* | 12/2011 | Zheng ................ H04J 14/0282 |
| | | 398/2 |
| 2012/0251097 A1 | 10/2012 | Elmardini et al. |
| 2015/0082078 A1* | 3/2015 | Jiang ................... G06F 11/3006 |
| | | 714/4.2 |

FOREIGN PATENT DOCUMENTS

| | | |
|---|---|---|
| WO | 2014/000804 A1 | 1/2014 |
| WO | 2014000804 A1 | 1/2014 |

\* cited by examiner

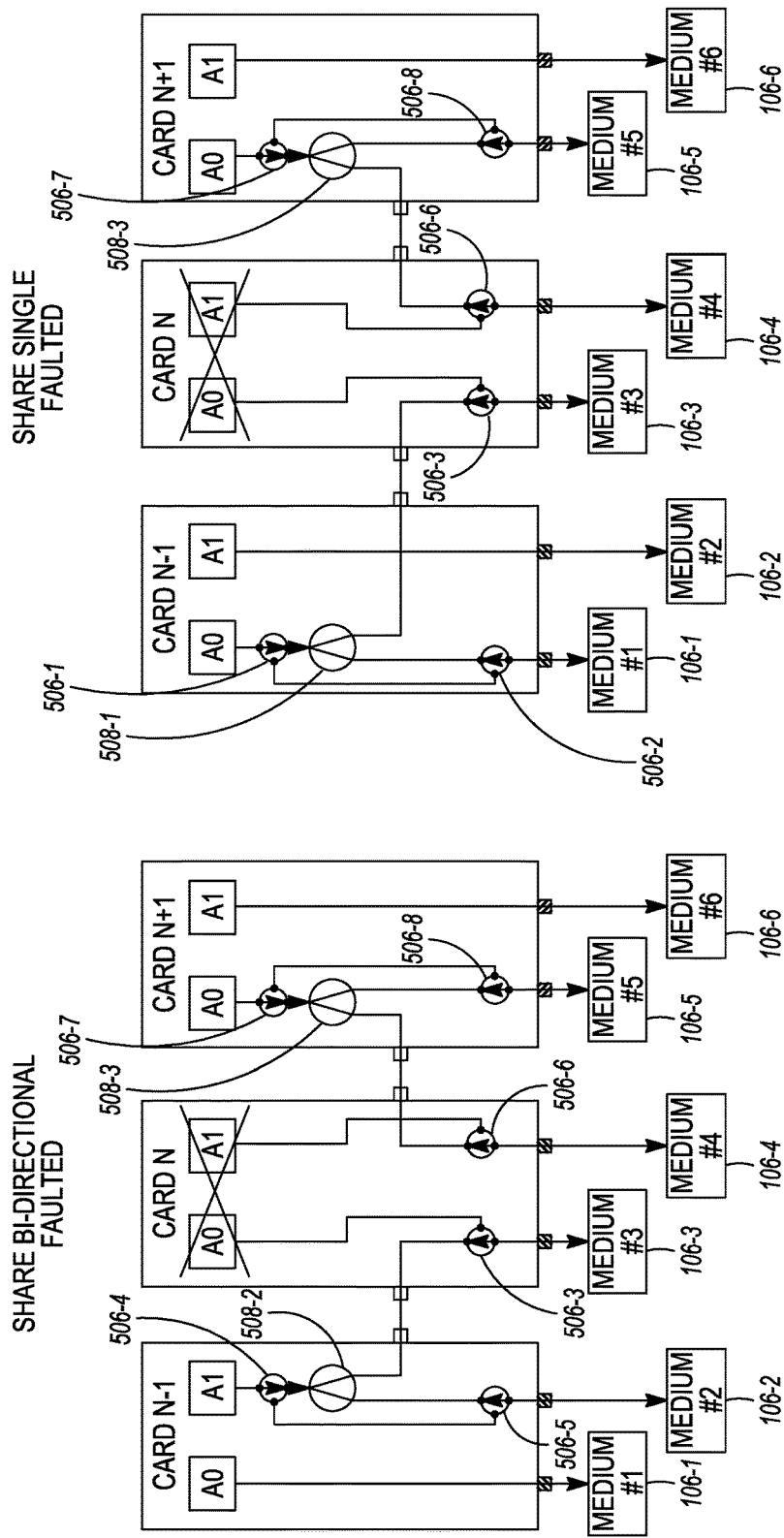

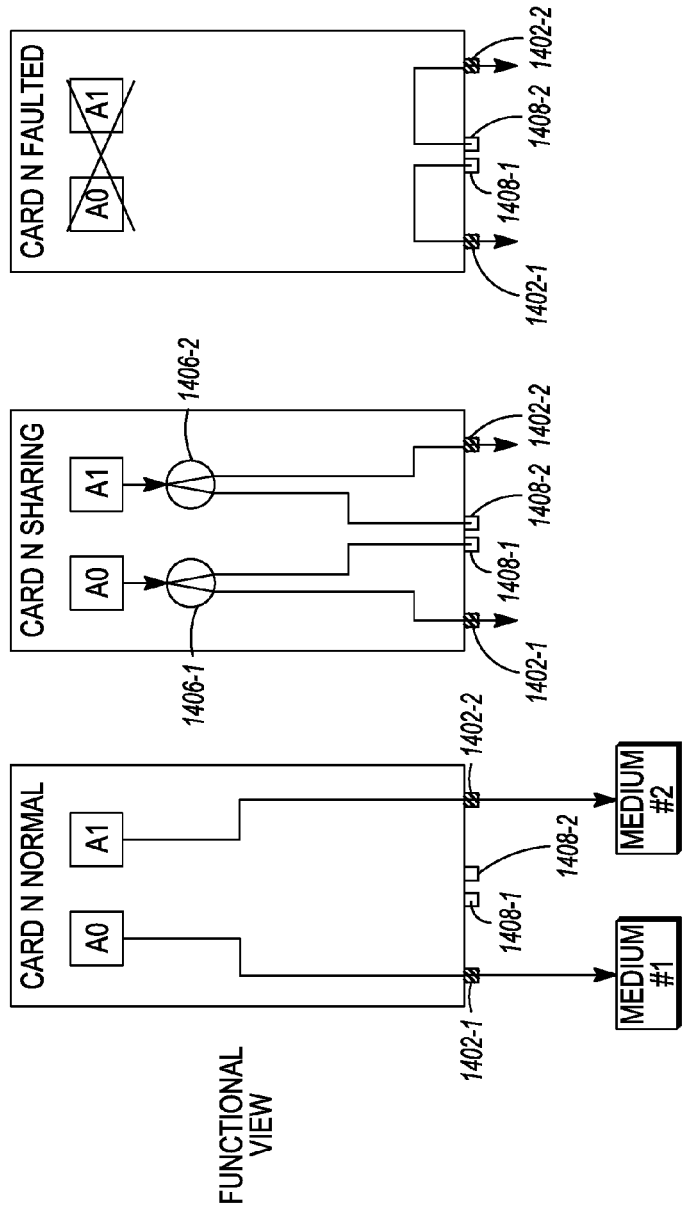

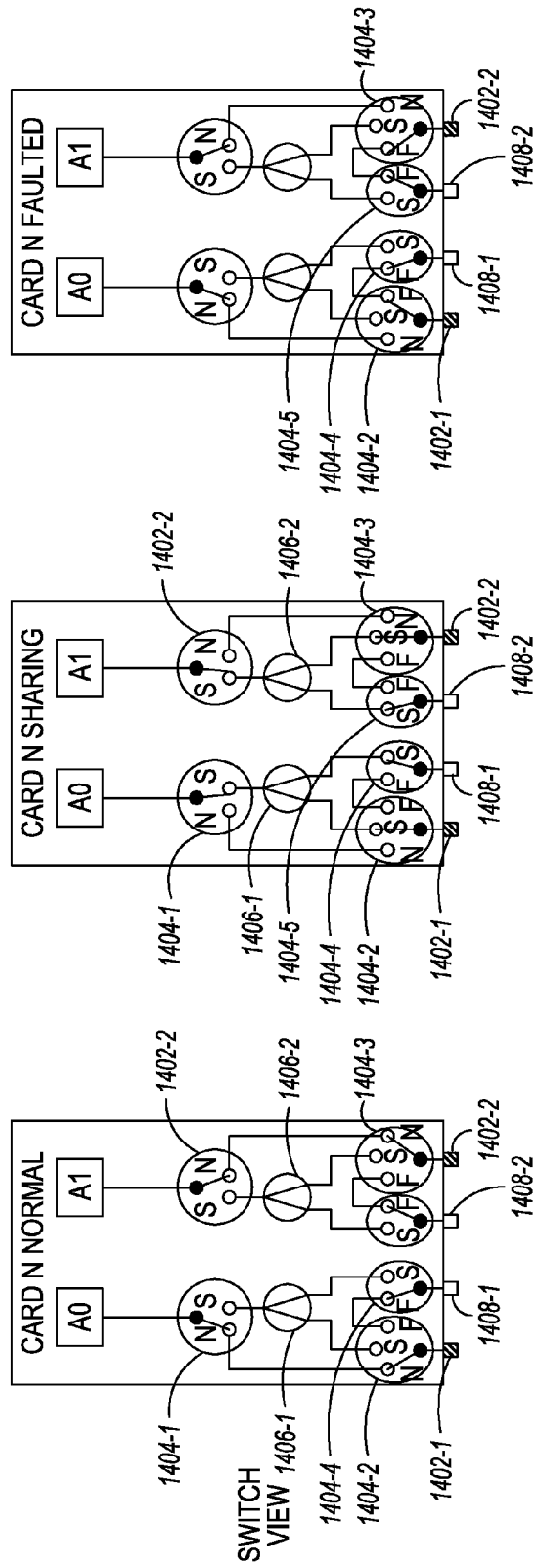

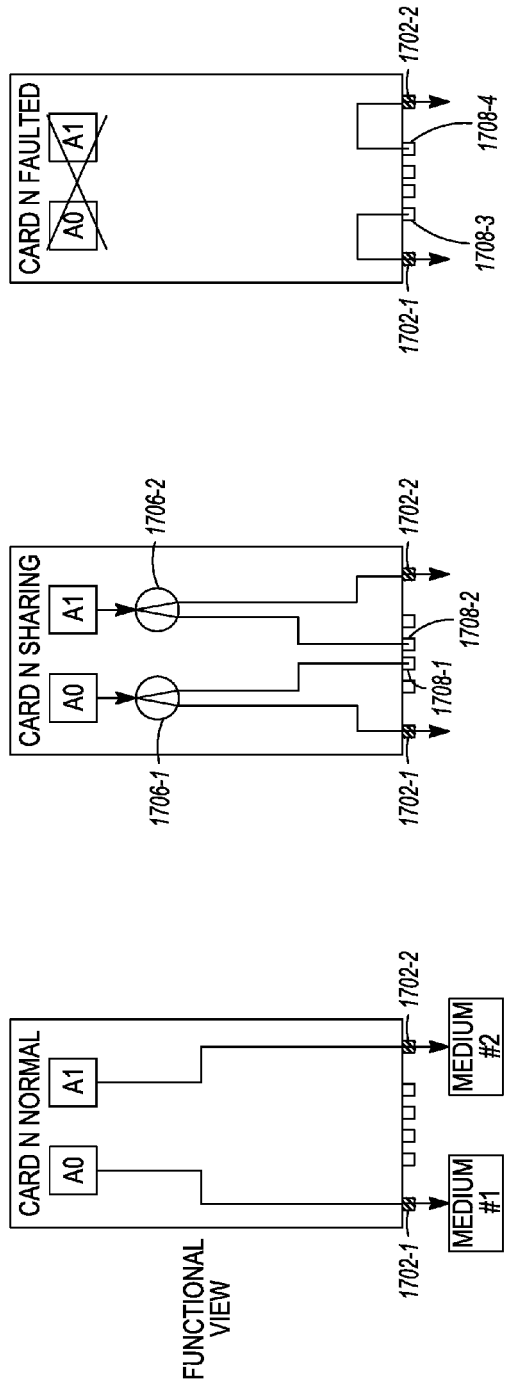

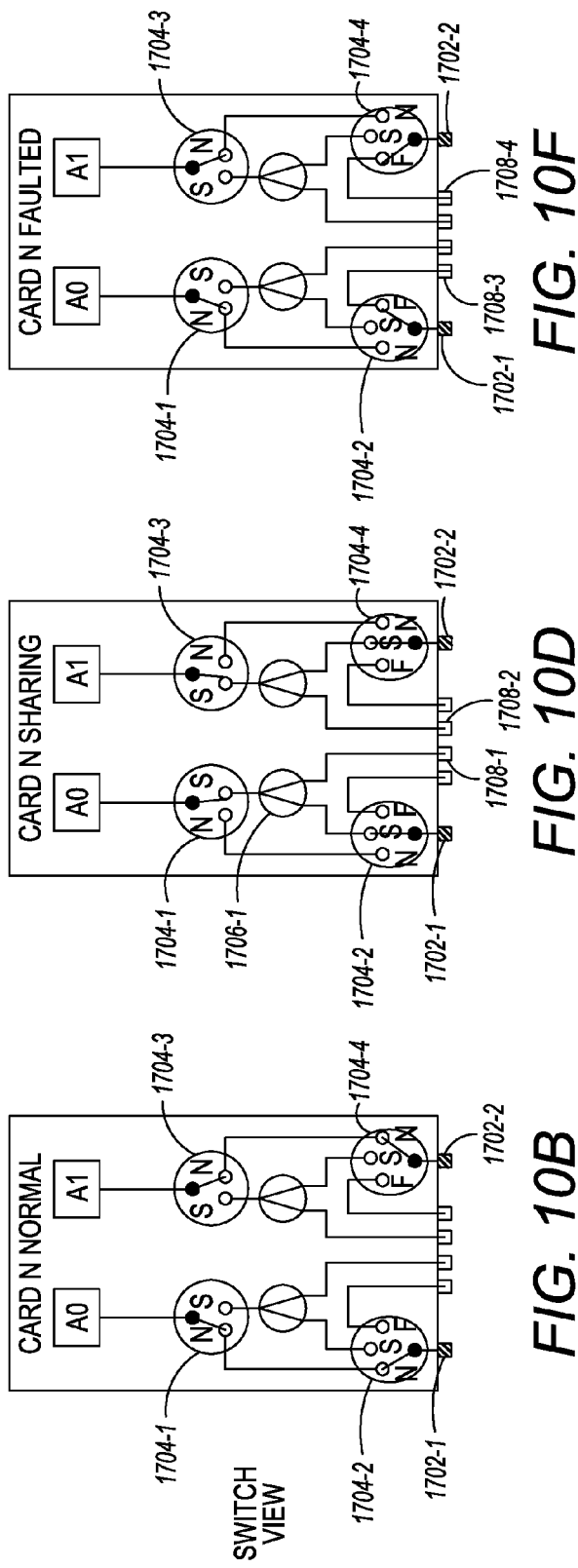

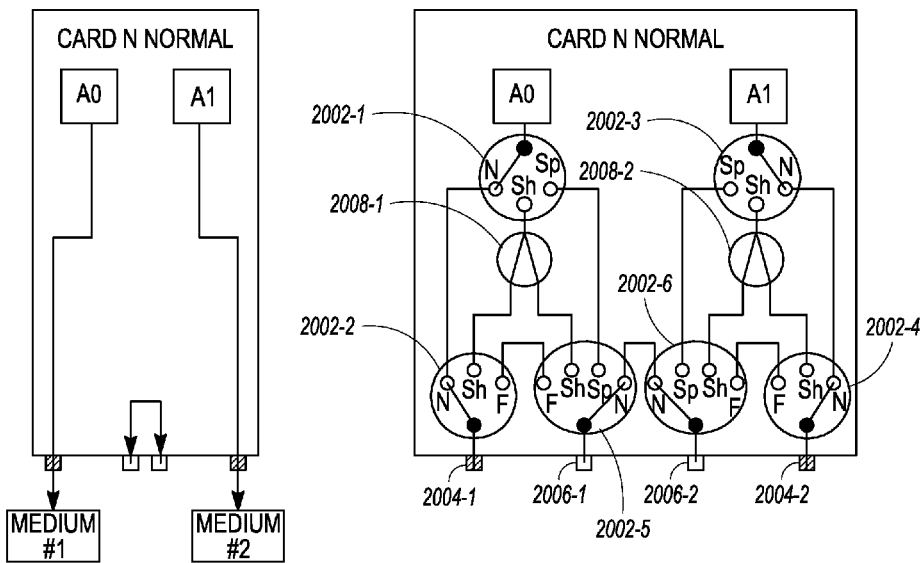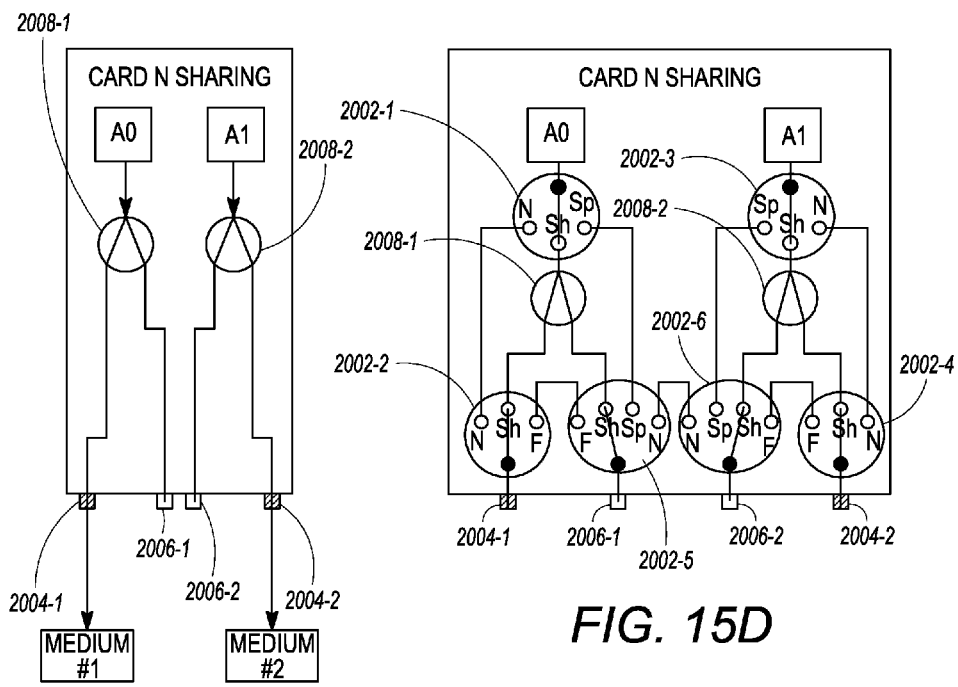
FIG. 15A  FIG. 15B  FIG. 15C  FIG. 15D

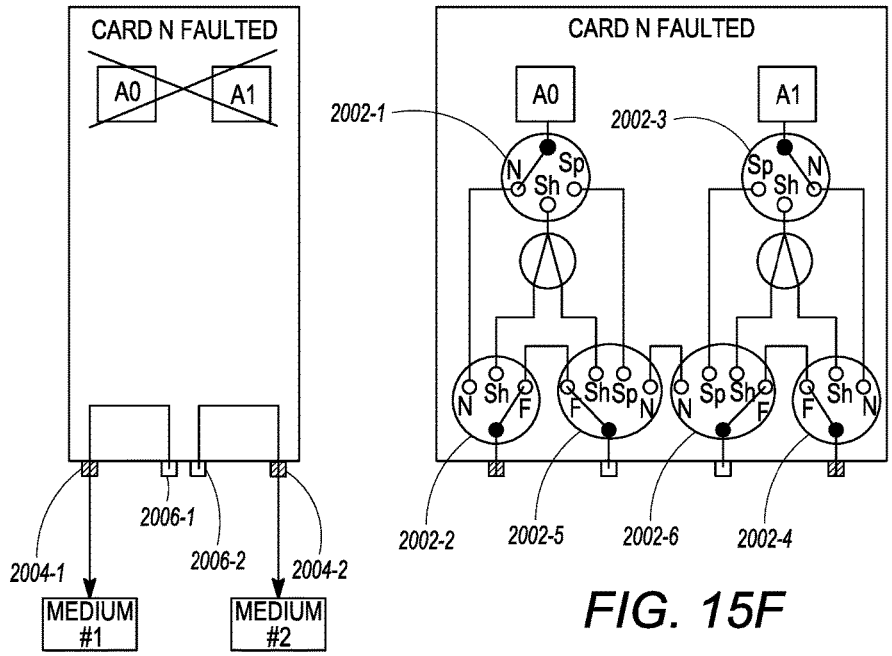
FIG. 15E
FIG. 15F
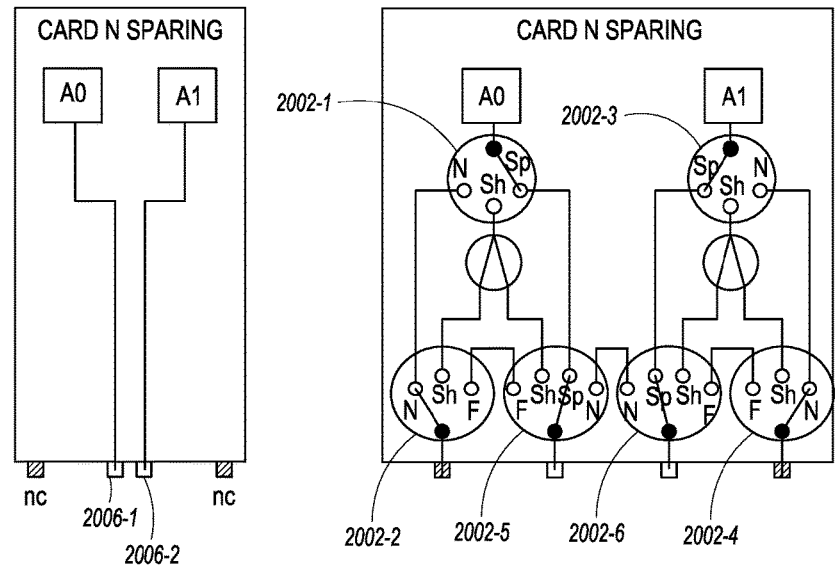
FIG. 15G
FIG. 15H

N+0 REDUNDANCY IN A NETWORK ACCESS SYSTEM

CROSS-REFERENCES TO RELATED APPLICATIONS

The present disclosure claims priority to U.S. Provisional App. No. 62/206,946, filed Aug. 19, 2015, the contents of which is incorporated herein by reference in its entirety.

BACKGROUND

In an access network, a solution to compensate for failures is important. One solution may provide a redundancy scheme where a spare transmitter takes over when a failure occurs to an active component (e.g., another transmitter or another structure with a transmitter) in the access network. One issue with using a spare is a dedicated spare module (e.g., a card) is included in the chassis including the other transmitters for the access network. This spare card is not active until there is a failure. That is, the spare is not transmitting to any medium (e.g., a service group/subscribers). Thus, there is a cost to support the sparing scheme that includes the cost of the spare module and also a switching matrix to connect the spare to take the place of the failed transmitter.

BRIEF DESCRIPTION OF THE DRAWINGS

FIG. 5C depicts an example of a share bi-directional N+0 sharing architecture according to one embodiment.

FIG. 5D depicts an example of a share single N+0 sharing architecture according to one embodiment.

FIGS. 7A-7F depict an example of a share bi-directional 2 input connector functional and switch views according to one embodiment.

FIGS. 10A-10F depict an example of share bi-directional 4 input connector functional and switch views according to one embodiment.

FIGS. 15A-15H depict an example of share/spare bi-directional 2 input connector functional and switch views according to one embodiment.

DETAILED DESCRIPTION

Described herein are techniques for an N+0 sharing scheme for an access network. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide an N+0 sharing scheme for networks. The N+0 sharing scheme includes no dedicated spare among a group of active elements. Each active element may provide service to a medium, which may be associated with a medium. When a failure to one of the active elements occurs, at least one of the working active elements takes the workload of the failed active element. The cost of N+0 sharing is a reduced per medium (e.g., service group) capacity during a failure. That is, some service groups may receive less bandwidth from the active element that is used in the sharing scheme to compensate for the failure. However, this may be preferable to service operators compared to the additional cost of including a spare for the group of active elements, or the complete loss of service that occurs when a failure occurs without a failure recovery scheme.

Overview

Figure 1A:
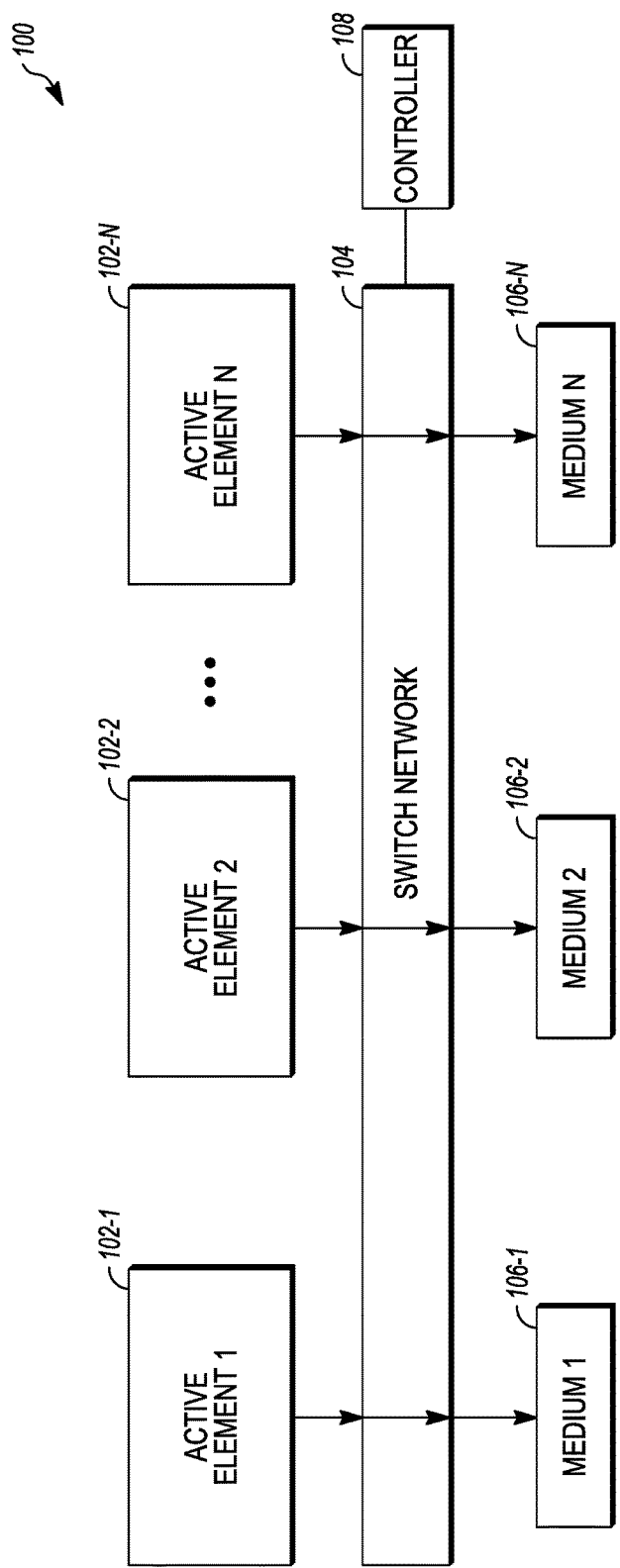
FIG. 1A depicts an example of a simplified system of a distribution network according to one embodiment.

FIG. 1A depicts an example of a simplified system of a distribution network 100 according to one embodiment. System 100 includes a number of active elements 102-1-102-N (active elements #1-#N), a switch network 104, and mediums 106-1-106-N (mediums #1-#N). Although this implementation of the distribution network system is described, variations will be appreciated. In one embodiment, distribution network includes a hybrid fiber coax (HFC) network, but other networks include RF cable-based systems, optical systems, wireless systems, and RF over-the-air systems (wireless drop), or any combination may be used. In network 100, a head-end (not shown, but includes active elements 102) communicates with subscribers that are organized into service groups (not shown but may be associated with a medium). It will be understood that other numbers of service groups could be provided. Each service group also includes a number of subscribers.

Network 100 may be part of an access network, which may be any technology that may connect users to services that include video, voice, and/or Internet. In one embodiment, the access network may be used in the "last mile" connection to end users. Examples of the access network include hybrid fiber coax solutions, digital subscriber line solutions, point-to-point Ethernet solutions, and passive optical network solutions. Active elements 102 may include transmitters that may transmit data to medium 106 and/or receivers that receive data from medium 106. In one embodiment, active elements 102 may include radio frequency (RF) transmitters, optical transmitters, and other active elements that may be used in transmitting or receiving data. As will be described in more detail below, active element 102 may be considered a structure (e.g., a card) that includes multiple transmitters. That is, a single active element is the card. In other embodiments, the active element is a single transmitter. The single transmitter may be part of a card that has one or more transmitters.

Medium 106 may be equipment use to provide service to a service group associated with subscribers. The service group is a group of subscribers that receive service from one active element 102. Medium 106 may include receiver equipment that receives data from active elements 102. The receiver equipment may be associated with multiple subscribers and may form a service group. Each subscriber may be generally a location or home for a subscriber. Each subscriber location may include customer premise equipment (CPE), such as a cable modem (CM), gateway, and/or a set-top box (STB), that can receive information from head-end 102 and also transmit information to the head-end (e.g., active elements 102).

The head-end includes a cable modem termination system (CMTS) (not shown). The head-end may include multiple CMTSs that service other service groups (not shown). A CMTS may provide data services, such as Internet, voice over Internet Protocol (VoIP), analog video services, or digital video services to the subscribers of a cable television (TV) operator. The CMTS may include multiple upstream and downstream ports and contain multiple transmitters/receivers (TX/RX), such as radio frequency (RF) transmitters/receivers. Each TX/RX may service a single service group and form a distribution system. Particular embodiments may provide transmitters and receivers at different architectural levels of system 100. For example, the transmitters and/or switch network may be included outside of the head-end, such as in a converged cable access platform (CCAP). For discussion purposes, transmitters will be described in the active element 102, but a person skilled in the art will appreciate how to apply the teaching in the reverse direction for a receiver and also with both a transmitter and a receiver with signal flow in both the forward and reverse directions Switch network 104 may include switching elements that can switch the connections between active elements 102 and medium 106. Switch network 104, such as a radio frequency (RF) switch, may be used share service of multiple service groups to an active element (e.g., a transmitter) when a failure occurs. In this case, the number of subscribers in a service group may be increased. Specific implementations of switch network 104 will be described in more detail below and are not limited to RF components.

A controller 108 may control switch network 104 to perform the sharing. To perform the sharing, controller 108 may switch paths within switch network 104 such that a service group sharing is performed. When paths are configured in switch network 104, the components in switch network are used to deliver the content to the connected service groups.

Switch network 104 may exist at different architectural levels of system 100. Switch network 104 may implement dynamic steering of signals, and may be in a separate chassis from active elements 102 or can be integrated into the same chassis as active elements 102. Controller 108 may be in a separate chassis from active elements 102 or can be integrated into the same chassis as the active elements. Further, controller 108 may be integrated into the same chassis as switch network 104. Controller 108 may include various circuits to implement the changing of paths in switch network 104.

In one example, a cable access module (CAM) may include switch network 104. A CAM may include multiple transmitters on a single blade for the CMTS. Each CAM may include N amplifiers/ports. Switch network 104 may share channels from being spread over N amplifiers/ports to some smaller number of amplifiers/ports.

Cable modems in a service group that are consolidated into another service group, and thus a new transmitter, might experience a short outage due to several reasons (e.g., the cable modems are moved to a different media access control (MAC) domain, there might be a short outage of service on the RF circuit feeding the cable modems, or the cable modems may experience a change in power, delay, or frequency from the new transmitter). The cable modems may therefore need to rearrange and/or re-register with the new transmitter, but this may take only a short amount of time that may not be noticeable.

When there are changes to the network topology, components higher up, and lower down in the data transport and routing hierarchy may need to reconfiguration as well. Changes such as these might include devices which change Internet Protocol (IP) routes to different cards, and, possibly even routers feeding an entire Converged Cable Access Platform (CCAP) if an entire CCAP becomes consolidated with others. Below the CCAP, the CMs may need to adapt to the new configuration, for example, the number of bonded channels might change, the frequencies which carry the data channels may change, etc. Even within a card, single components may serve several service groups. These too may require reconfiguring. Particular embodiments may use advanced signaling to subscriber devices to preconfigure the parameters needed for the consolidation or redistribution back to the original service groups.

Cable modems in a service group that are consolidated into another service group, and thus a new transmitter, might experience a short outage due to several reasons (e.g., the cable modems are moved to a different media access control (MAC) domain, there might be a short outage of service on the RF circuit feeding the cable modems, or the cable modems may experience a change in power, delay, or frequency from the new transmitter). The cable modems may therefore need to rearrange and/or re-register with the new transmitter, but this may take only a short amount of time that may not be noticeable.

If the RF channels onto which subscribers are consolidated are shared by multiple MAC domains, then the users may not experience an outage at all when consolidated or redistributed. Also, particular embodiments may provide advanced signaling to all subscriber devices to preconfigure the parameters for either a consolidation or redistribution event before that event happens. This switch is intended to reach steady, operational state quickly.

Different embodiments for network 100 will now be described.

Referring to FIG. 1A, before a failure, active element #1 services medium #1 through switch network 104; active element #2 services medium #2 through switch network 104; and active element #N services medium #N through switch network 104. There is a 1:1 relationship between an active element and a medium. It will be understood that there may be other ratios of active elements servicing different numbers of service groups. For example, active element #1 may be servicing medium #1 and medium #2 in some cases. However, in this embodiment, no spare exists that can be coupled by switch network 104 to service a medium that has an associated active element 102 that has failed.

In one arrangement, a spare may not exist that could be switched by switch network 104 to service medium #X that is associated with an active element #X that has failed. In particular embodiments, controller 108 controls switch network 104 such that another active element will be switched to service multiple mediums 106. For example, if active element #X fails, then switch N will connect the signal to/from splitter #X+1 (or splitter #1 if X=N) to medium #X. Then, the service groups being serviced by one active element 102 will be increased and thus bandwidth to the shared service group may be decreased. However, both service groups may not experience an extended failure. By including a splitter in the signal transmission, there may be a signal level loss due to the splitter or the switch. An amplifier may be used, which may be included in active element 102 or external to the active element, such as included in switch network 104, to compensate for the loss.

Figure 1B:
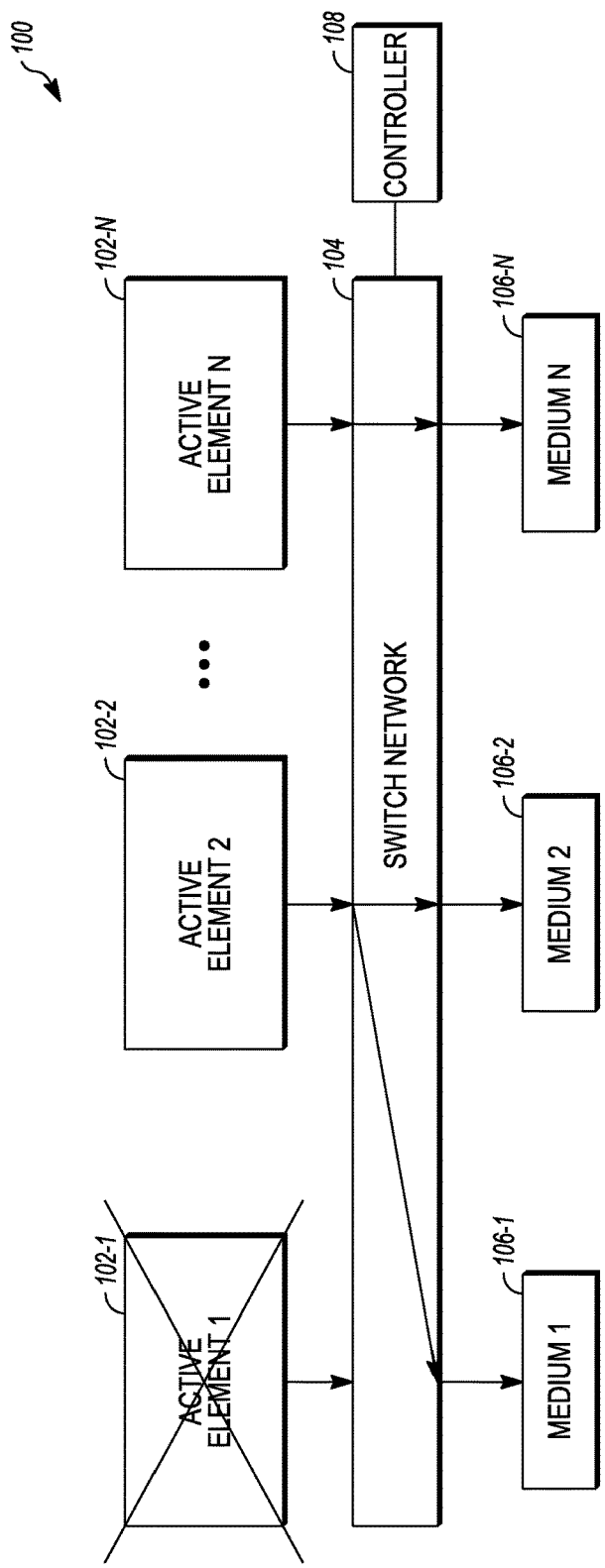
FIG. 1B depicts an example of a system after a failure of active element #1 according to one embodiment.

FIG. 1B depicts an example of system 100 after a failure of active element #1 according to one embodiment. When a failure to active element #1 occurs, active element #1 no longer services any medium. In response, controller 108 switches components in switch network 104 such that active element #2 services both medium #1 and medium #2. As discussed above, this reduces the bandwidth available to medium #2, but the service operator is still able to provide service to medium #1.

Controller 108 may use different methods for switching active element #2 to share service between medium #1 and medium #2. Also, the sharing is not limited to just one active element. For example, multiple active elements may be used in the sharing scheme. These different implementations will be described in more detail below.

By servicing more than one medium, the service groups associated with each medium may be combined. The increase in the number of subscribers being serviced by active element #2 decreases the amount of bandwidth available for each subscriber. For example, subscribers associated with medium #1 and medium #2 might experience less bandwidth in general, while more critical applications like voice and video may continue on medium #1 and medium #2 without degradation. However, this may be desirable for a service operator because the end users of medium #1 do not experience a total extended failure. Further, a chassis (or other apparatus) does not have to include space for a spare to compensate for the failure. It is noted that medium #N, which is not involved in the sharing, still experiences the same bandwidth.

Examples of N+0 Sharing with Splitters

Figure 2A:
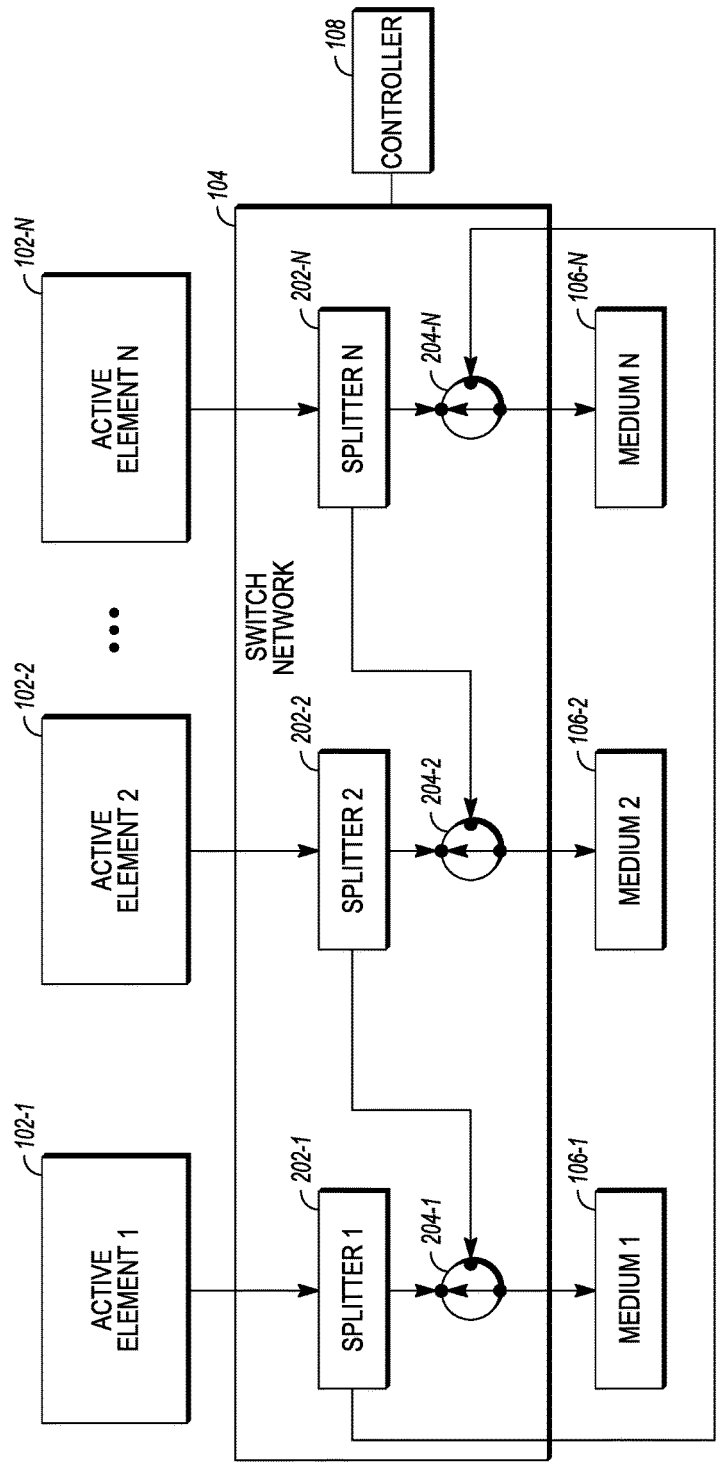
FIG. 2A depicts an example of an N+0 architecture sharing using splitters according to one embodiment.

FIG. 2A depicts an example of N+0 architecture sharing using splitters according to one embodiment. In one embodiment, the splitter splits the signal into multiple signals in the downstream direction, and may be a connection element. It is noted the splitter could be replaced with a combiner in the reverse (upstream) direction. Further, the splitter may be a combined splitter and combiner. The splitter may be in the time, frequency, or other domains. In one embodiment, network 104 uses a power splitter that splits the power in half Switch network 104 includes splitter #1 202-1, splitter #2 202-2, . . . splitter #N 202-N and switches #1-N 204-1-204-N. In this example, there is no dedicated spare that is capable of taking over for a failed active element #1-N. For example, there is no spare in a set of slots in a chassis that can service these active elements. One difference between sparing and sharing is that if a spare is used, a splitter is not necessary to perform the failover. That is, switches can be used to connect a spare active element to the failed medium. However, in sharing, a splitter is needed to connect the active element to the failed medium.

At this time, there has not been a failure. Thus, active element 102-1 is connected to medium #1 through splitter 202-1 and switch 204-1. Further, the other active elements are connected to respective mediums, such as active element #2 is connected to medium #2 through splitter #2 and switch 204-2. Basically, splitter X where X is a number between 1 and N, connects a signal to/from active element #X to both switch X and switch X−1, or if X=1, then to switch N and 1. For example when N=3, splitter #2 is connected to switch 204-1 and switch 204-2. Further, splitter #N is connected to switch 204-2 and switch 204-N. Splitter #1 is connected to switch 204-1 and also wraps around to switch 204-N.

Figure 2B:
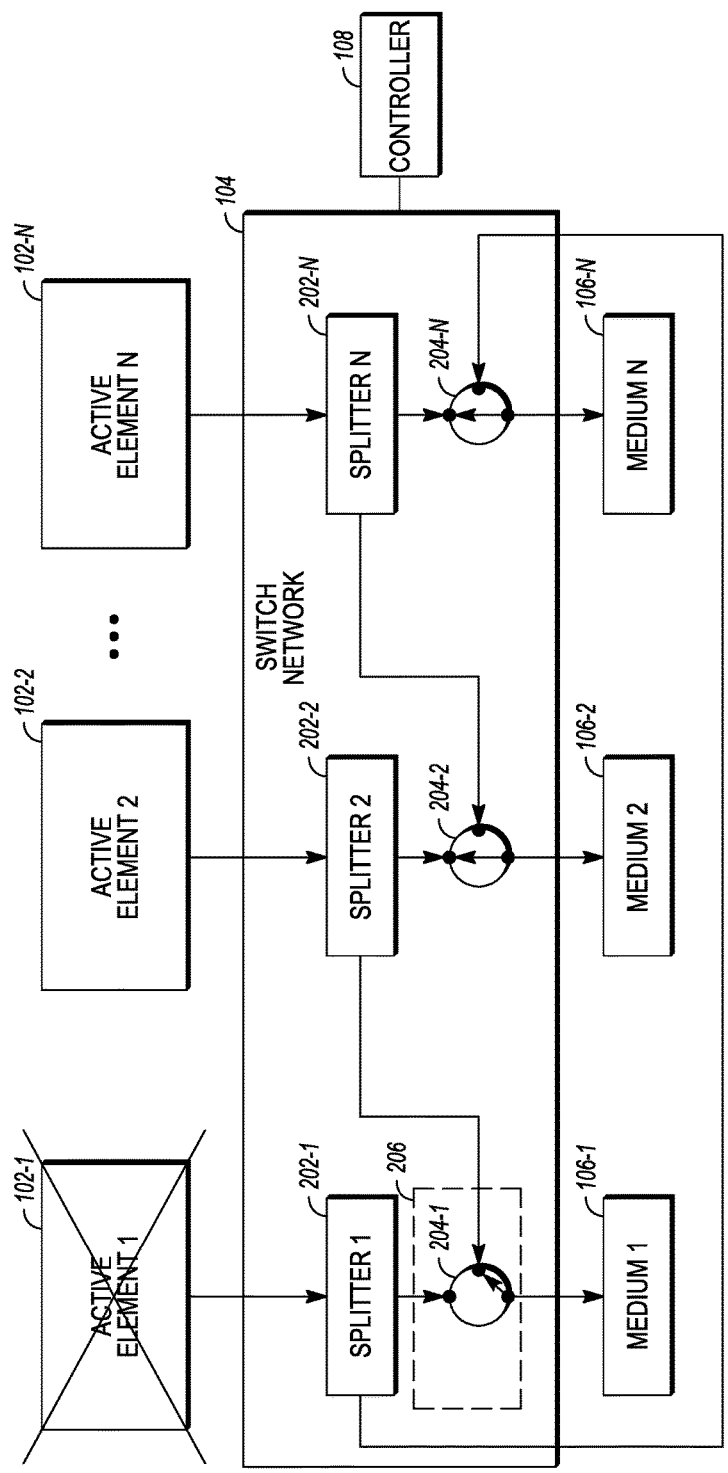
FIG. 2B depicts an example of a switch network when a failure occurs according to one embodiment.

FIG. 2B depicts an example of switch network 104 when a failure occurs according to one embodiment. In this case, active element #1 has failed.

To compensate for the failure, active element #2 provides service to both medium #1 and medium #2. To perform the sharing, controller 108 reconfigures switch network 104. For example, the input of switch 204-1 is switched from a first position connected to splitter #1 and active element #1 to a second position that is connected to splitter #2. This change is shown in a box 206. In this case, controller 108 may cause switch 204-1 to change connections. This connects active element #2 through splitter #2 to medium #1 and medium #2.

Figure 3A:
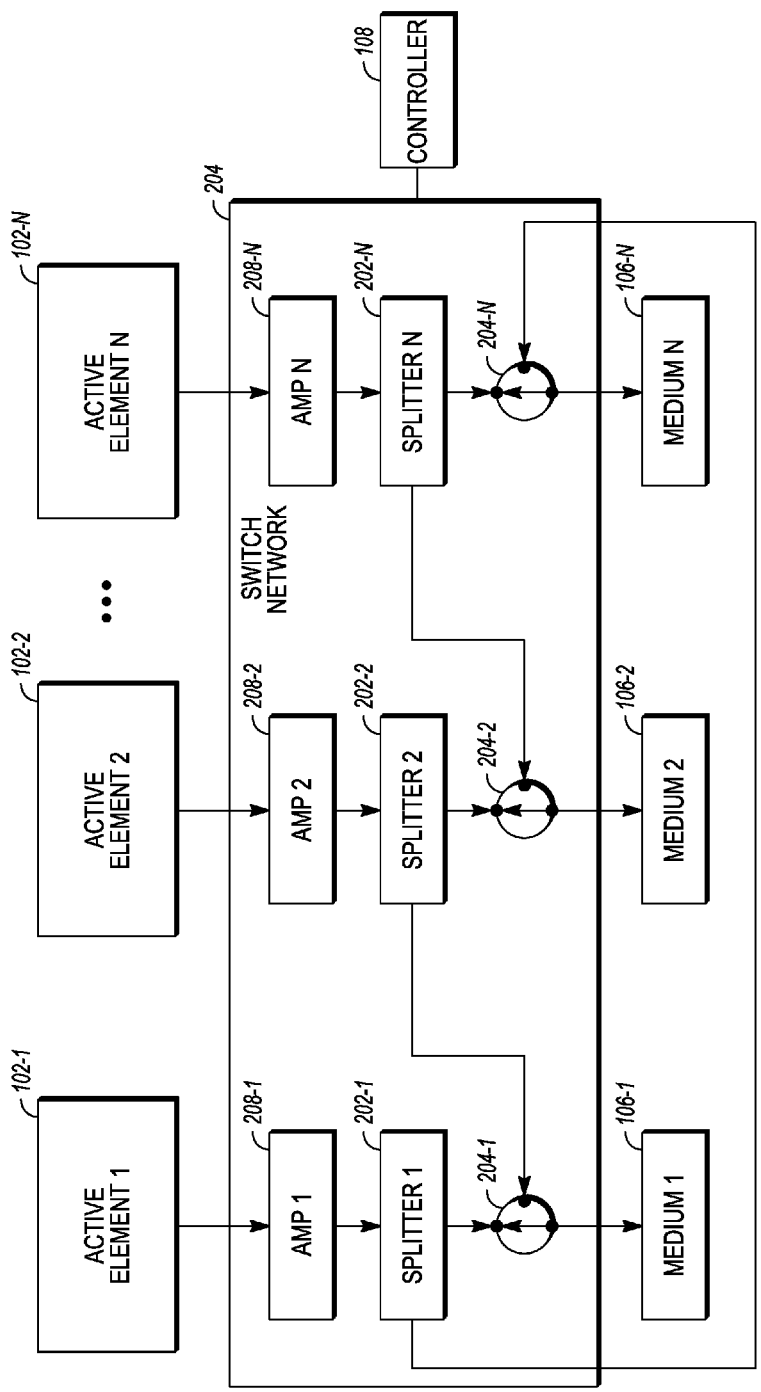
FIG. 3A depicts an example of a switch network with an amplifier included according to one embodiment.

There may or may not be an amplifier (amp X) in system 100 to compensate for any signal level loss due to the splitter and/or switch being introduced into the connection. The amplifier may be part of the active element or may be external to the active element. FIG. 3A depicts an example of switch network 204 with an amplifier included according to one embodiment. As shown, amplifiers (amp) #1 208-1, amp #2 208-2, ... amp #N 208-N have been included in switch network 204. Although amplifiers 208 are shown in switch network 204, it will be understood that the amplifiers may be external to switch network 204, such as part of active elements 102. In this case, amplifiers 208 amplify the signal from each active element 102. This compensates for the loss experienced based on splitter 202 and/or switch 204.

Figure 3B:
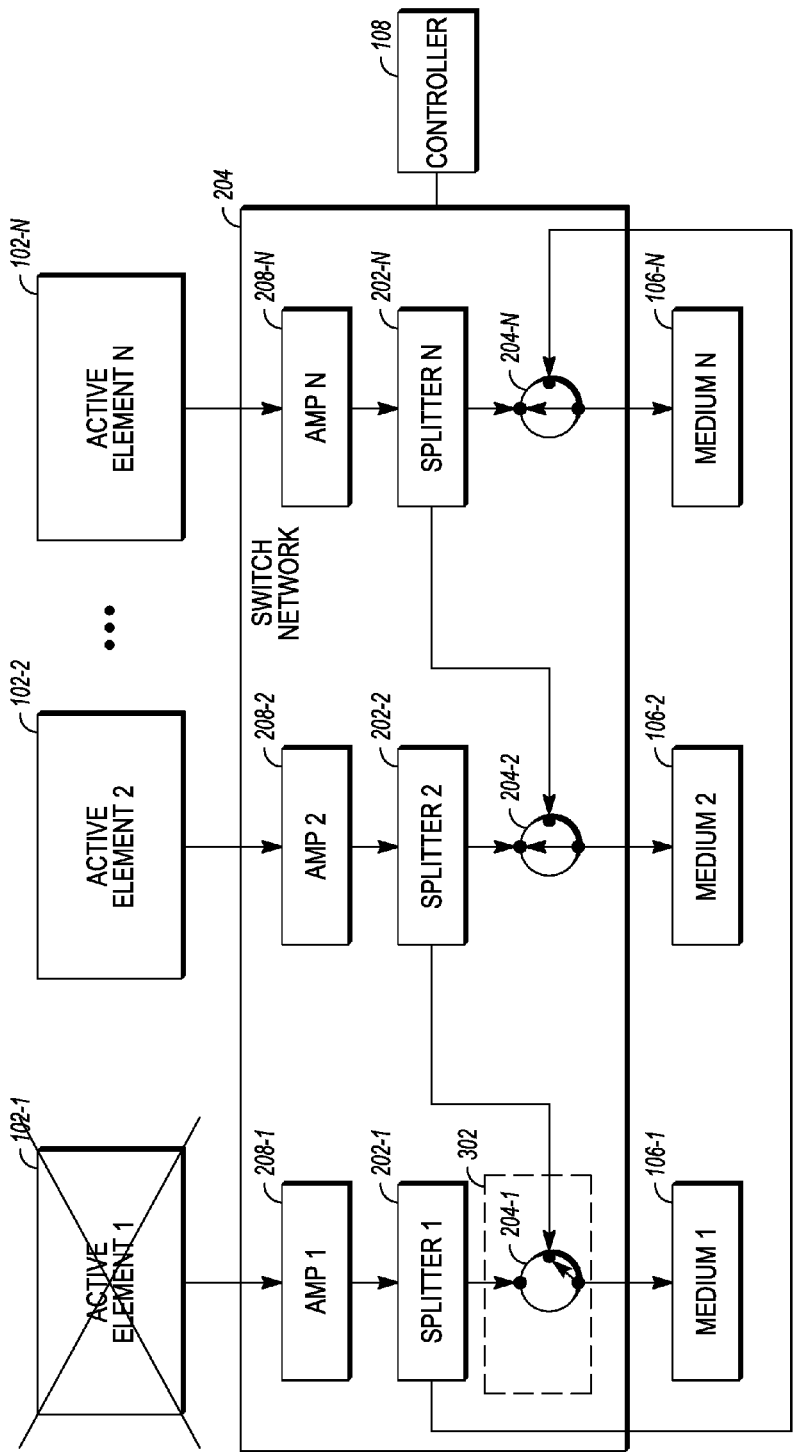
FIG. 3B depicts an example of FIG. 3A when a failure occurs according to one embodiment.

FIG. 3B depicts an example of FIG. 3A when a failure occurs according to one embodiment. In this case, amp #2 compensates for any possible loss experienced at splitter #2 and switch #1 for medium #1. Also, amp #2 compensates for any loss experienced by medium #2 by splitter #2 and switch #2.

Figure 4A:
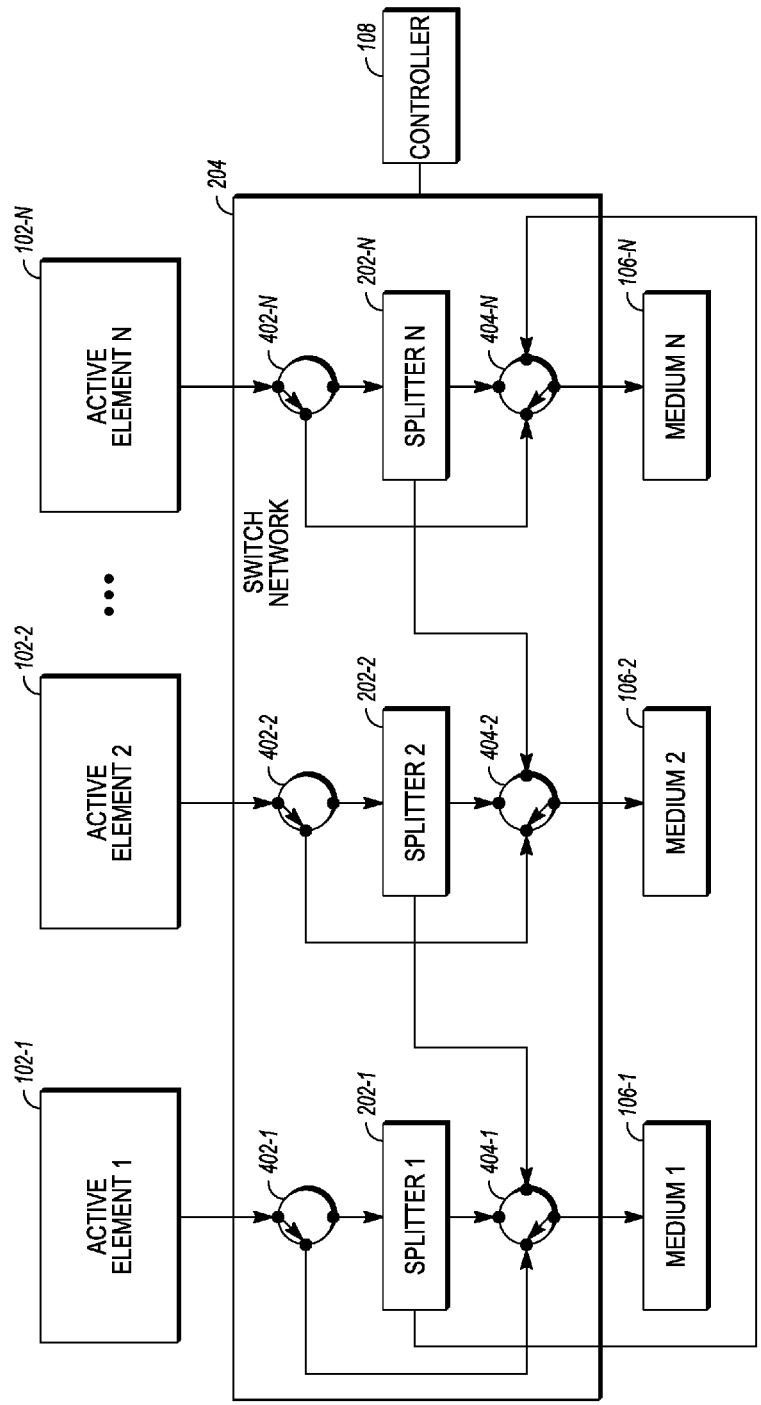
FIG. 4A depicts an example of a switch network where splitter loss is not experienced when not in a failure state according to one embodiment.

An additional switch may be added to the network such that the loss is not experienced when not in a failure state. That is, the path from an active element to a medium does not go through a splitter. FIG. 4A depicts an example of switch network 204 where splitter loss is not experienced when not in a failure state according to one embodiment. Switches 402-1, 402-2, ... 402-N have been added to switch network 204. This switch is a single input with two outputs. When the system is in a non-failure state where X is an active device, the output of switch 402 couples to the input of switch 404.

Figure 4B:
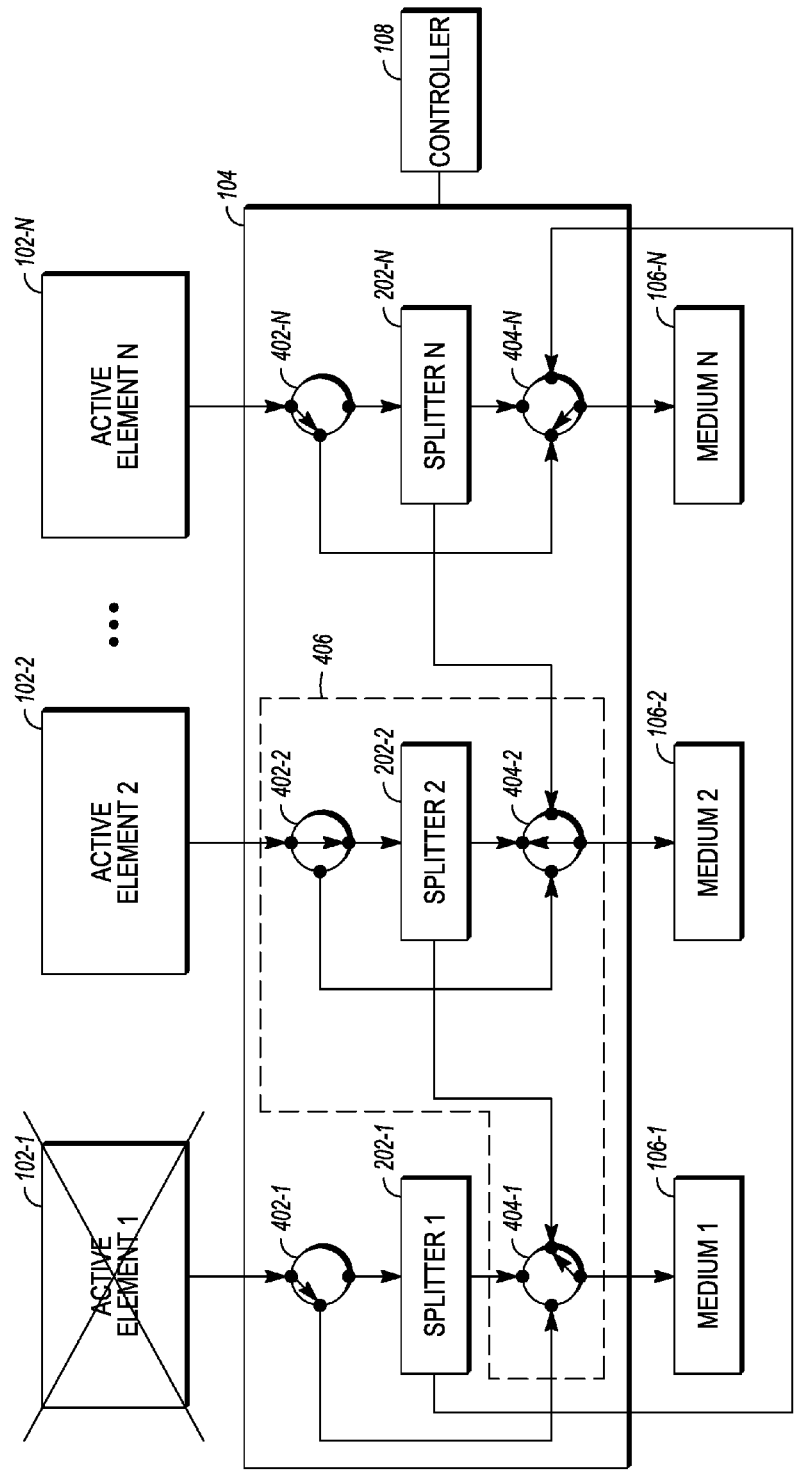
FIG. 4B depicts an example of FIG. 4A when a failure occurs according to one embodiment.

FIG. 4B depicts an example of FIG. 4A when a failure occurs according to one embodiment. In this case, active element #1 has failed. In this case, where X is the failed active element and active element #X+1 is the active element providing service to medium #N+1, the output of switch 402-2 is coupled to the input of splitter #2. Also, the input of switch 404-2 is connected to the output of splitter #2. Further, the output of splitter #2 is connected to the input of switch 404-1. These changes are shown in a box at 406. As can be seen, active element #2 is now providing service to medium #1 and medium #2.

Different N+0 Sharing Schemes Using Cards

Overview of Share Right, Share Bi-Directional, Share Single, Share Split, and Share Pair Configurations Certain implementations may contain a chassis with cards where each card may contain more than one active element. FIG. 5A-5F show scenarios where there are two active elements per card identified as A0 and A1, but other numbers of active elements may be appreciated. There are multiple possible N+0 architecture sharing schemes that may be applied to this scenario. FIGS. 5A-5F show examples of different N+0 sharing schemes according to one embodiment. The sharing schemes may include share right, share bi-directional, share single, share split, and share pair. Share right may be where a card to the left of the failed card is used to compensate for the failure. Share bi-directional is where transmitters on cards on both sides of the failed card that are closest to the failed card (transmitter #A1 and transmitter #A0) are used to compensate for the failure. Share single is where transmitters on two cards next to the failing card that are either the first or second transmitter in the card (either transmitter #A0 or transmitter #A1 on both cards) each compensate for the failure. Share split is where a failed card receives a signal from one transmitter from a neighboring card and splits the signal for its two outputs. In this case, card N has failed. Share pair is where cards are paired into 1:1 failure groups that can share for each other.

Figures 5A, 5B:
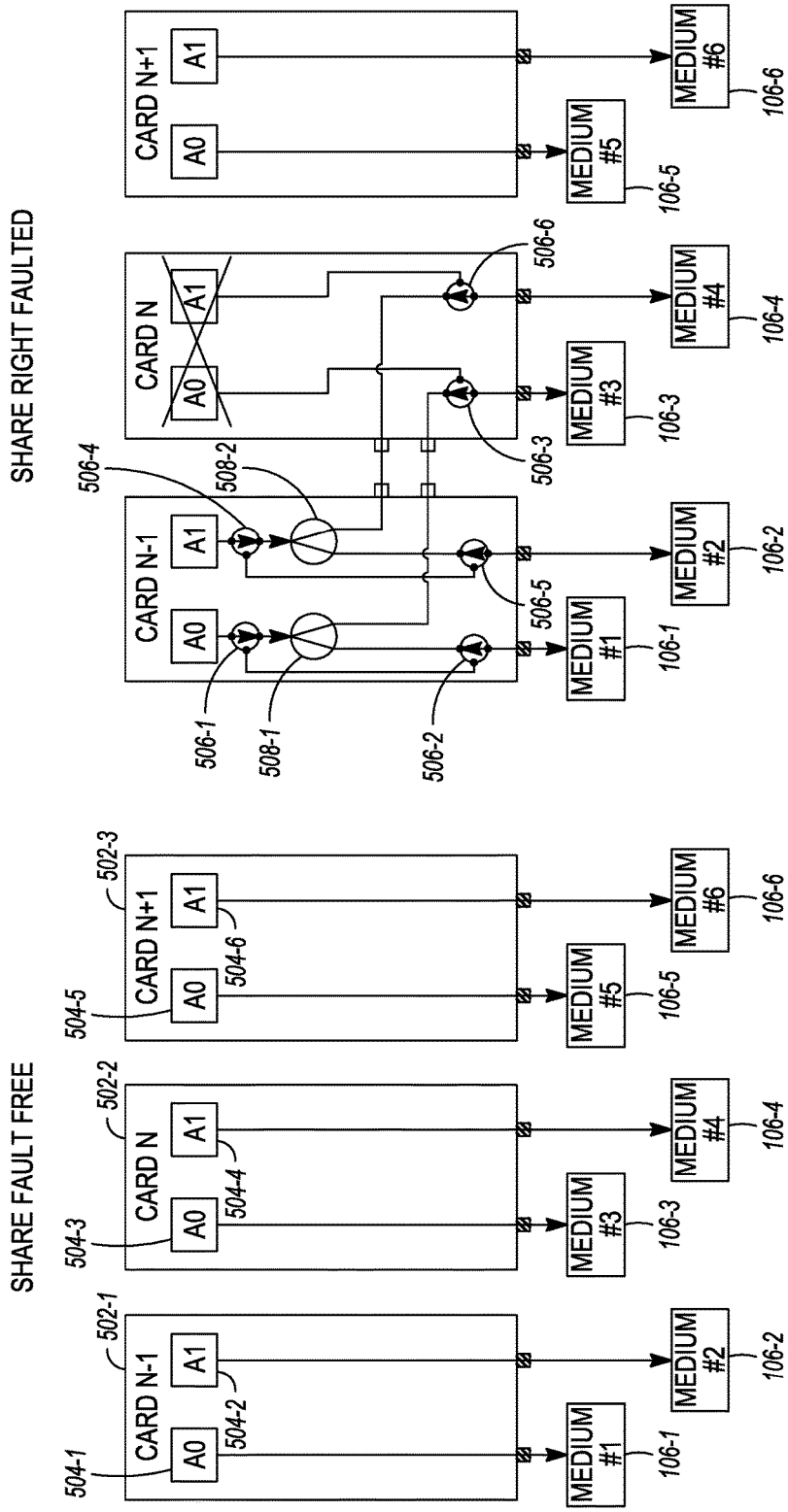
FIG. 5A depicts an example of a system in a fault-free environment according to one embodiment.
FIG. 5B depicts an example of a share right N+0 sharing architecture according to one embodiment.

FIG. 5A depicts an example of system 100 in a fault-free environment according to one embodiment. System 100 includes a plurality of cards labeled as N−1, N, and N+1, which for illustration purposes are consecutively placed in slots in a chassis. A card may be inserted in a slot in the chassis and includes M transmitters/receivers. In one embodiment, each card may include M active elements and part of switch network 204 as described above. For example, the card includes M number of transmitter channels, such as a two channel transmitter #A0 and transmitter #A1. In this case, a card may include two active elements (e.g., transmitters). In other examples, the active element may refer to the card, which would include multiple transmitters. When M=2, active elements 102 may be referred to as transmitters #A0 and #A1 and switch network 104 includes the switching elements that are shown. Further, controller 108 is not shown, but controls the switching that will be described herein.

Each transmitter services one medium. So a card may service two mediums with the 2-channel transmitter. Cards may service other numbers of mediums, however. For clarity, not all switches and splitters are usually shown in the figures, but may exist and route the signals from transmitters to respective mediums without sharing.

FIG. 5B depicts an example of the share right N+0 sharing architecture according to one embodiment. In this case, card #N has failed. The card to the left of card #N is then used to compensate for the failure. Transmitter #A0 and transmitter #A1 of card #N−1 compensate for transmitter #A0 and transmitter #A1, respectively, of card #N. Controller 108 configures switches in both card #N−1 and card #N to perform the sharing.

For transmitter #A0, controller 108 switches switch 506-1 from providing service to only medium #1 to be connected to splitter 508-1. Splitter 508-1 is then coupled to switch 506-2 of card #N−1 and switch 506-3 of card #N. Also, an input for switch 506-2 is changed to be coupled to splitter 508-1 from switch 506-1. That is, switch 506-2 is connected to switch 506-1 through splitter 508-1 now. Further, the input of switch 506-3 is changed from transmitter #A0 of card #N to be connected to splitter 508-1. In this case, transmitter #A0 of card #N−1 now services both medium #1 and medium #3.

For transmitter #A1 of card #N−1, switches 506-4, 506-5, and 506-6 are switched similarly as described above with transmitter #A0 of card #N−1. This causes transmitter #A1 of card #N−1 to service medium #2 and medium #4 to compensate for the failure of transmitter #A1 of card #N.

Card #N+1 is not used in the share right scheme and has not experienced a failure and thus transmitter #A0 of card #N+1 continues to service medium #5 only and transmitter #A1 of card #N+1 continues to service medium #6 only.

FIG. 5C depicts an example of a share bi-directional N+0 sharing architecture according to one embodiment. In this case, card #N has failed and cards N−1 and N+1 are used to compensate for the failure. Specifically, transmitter #A1 of card #N−1 is used to service medium #3 in place of transmitter #A0 of card #N and transmitter #A0 of card #N+1 is used to service medium #4 in place of transmitter #A1 of card #N. In this case, the two cards that are next to the failing card each share its closest transmitter with the failed card. The share bi-directional N+0 sharing scheme reduces the amount of interconnect required between the cards.

To compensate for the failure of transmitter #A0 of card #N, switch 506-4 of card #N−1 is switched from being coupled to switch 506-5 to be coupled to splitter 508-1. This couples splitter 508-2 to switch 506-5 and medium #2 and also couples switch 508-2 to switch 506-3 of card #N and to medium #3. Switch 506-3 is switched from being coupled to transmitter #A0 of card #N to transmitter #A1 of card #N−1. Thus, transmitter #A1 of card #N−1 is now servicing both medium #2 and medium #3. Similarly, controller 108 switches switch 506-7 to be connected to splitter 508-3. Also, switch 506-8 is switched from being coupled to switch 506-7 to being coupled to splitter 508-3. In this case, splitter 508-3 is now connected to switch 506-6 of card #N and switch 506-8 of card #N+1. Transmitter #A0 of card #N+1 services medium #4 and medium #5. Transmitter #A0 of card #N−1 still services medium #1 only and transmitter #A1 of card #N+1 still services medium #6 only.

FIG. 5D depicts an example of a share single N+0 sharing architecture according to one embodiment. In this case, the two cards next to the failed card each share their transmitter #A0 to compensate for the failed card. This is different from the bi-directional sharing in that transmitter #A0 is used in card #N−1 instead of transmitter #A1. This reduces the amount of switching and splitting resources required with each card.

In card #N−1, controller 108 switches switch 506-1 similarly to that as discussed with respect to FIG. 5B such that the output of switch 506-1 is coupled to splitter 508-1 instead of switch 506-2. In this case, the signal goes through splitter 508-1 before going through switch 506-2 to medium #1. Also, controller 108 switches switch 506-3 such that its input is coupled to the output of splitter 508-1. Transmitter #A0 now services medium #1 and medium #3.

Transmitter #A0 of card #N+1 is also similarly switched as discussed with respect to FIG. 5C. In this case, controller 108 switches switch 506-7 and switch 506-8 as discussed above. The outputs of splitter 508-3 are coupled to the inputs of switch 506-6 and switch 506-8. Transmitter #A0 of card #N+1 now services medium #4 and medium #5.

Figure 5E:
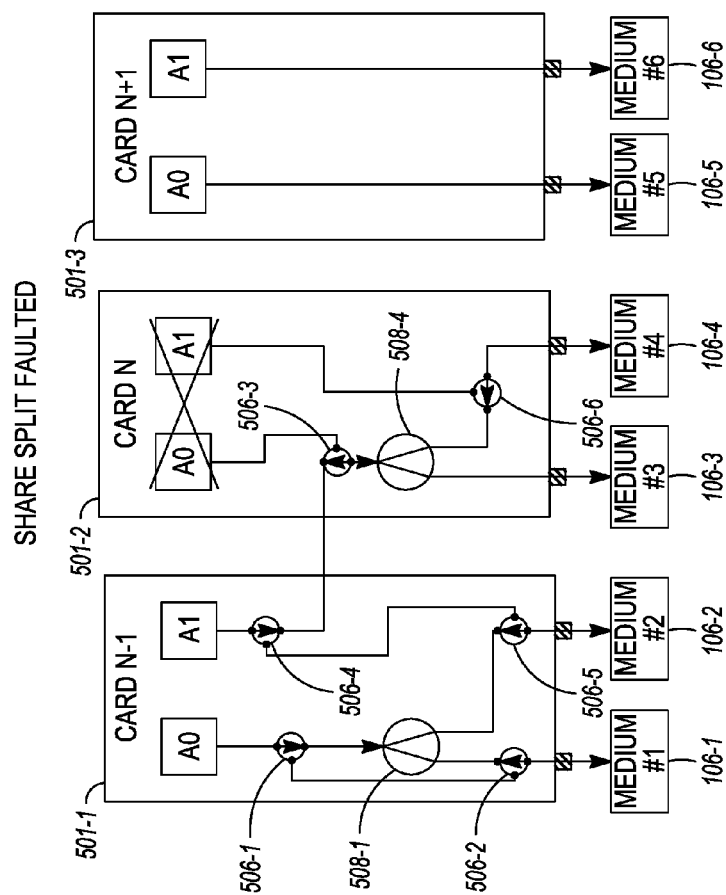
FIG. 5E depicts an example of a share split N+0 sharing architecture according to one embodiment.

FIG. 5E depicts an example of a share split N+0 sharing architecture according to one embodiment. In this scheme, a failed card receives a signal from one transmitter from a neighboring card and splits the signal for its two outputs. In this case, card #N has failed. Transmitter #A1 of card #N−1 is used to compensate for the failure. However, transmitter #A0 of card #N+1 may also be used. Further, other transmitters from other cards may be used, such as transmitter #A0 from card #N−1 or transmitter #A1 from card #N+1.

To compensate for the failure, controller 108 switches the output of switch 506-4 from being coupled to the input of switch 506-5 to the input of switch 506-3 of card #N. In this case, transmitter #A1 of card #N−1 does not service medium #2 anymore. Rather, the signal from transmitter #A1 of card #N−1 is now passed from switch 506-3 to splitter 508-4, which splits the signal to medium #3 and medium #4. To reach medium #4, controller 108 switches the input of switch 506-6 to be coupled to the output of splitter 508-4. This changes the input of switch 506-6 from being coupled to transmitter #A1 of card #N to transmitter #A1 of card #N−1.

Since medium #2 is not being serviced by transmitter #A1 of card #N−1 anymore, transmitter #A0 of card #N−1 is switched to service medium #2 and medium #1. In this case, controller 108 switches the output of switch 506-1 to splitter 508-1. This switches the output of switch 506-1 from the input of switch 506-2 to the input of splitter 508-1. The outputs of splitter 508-1 are then input into switches 506-2 and 506-5. Transmitter #A0 then services medium #1 and medium #2.

Figure 5F:
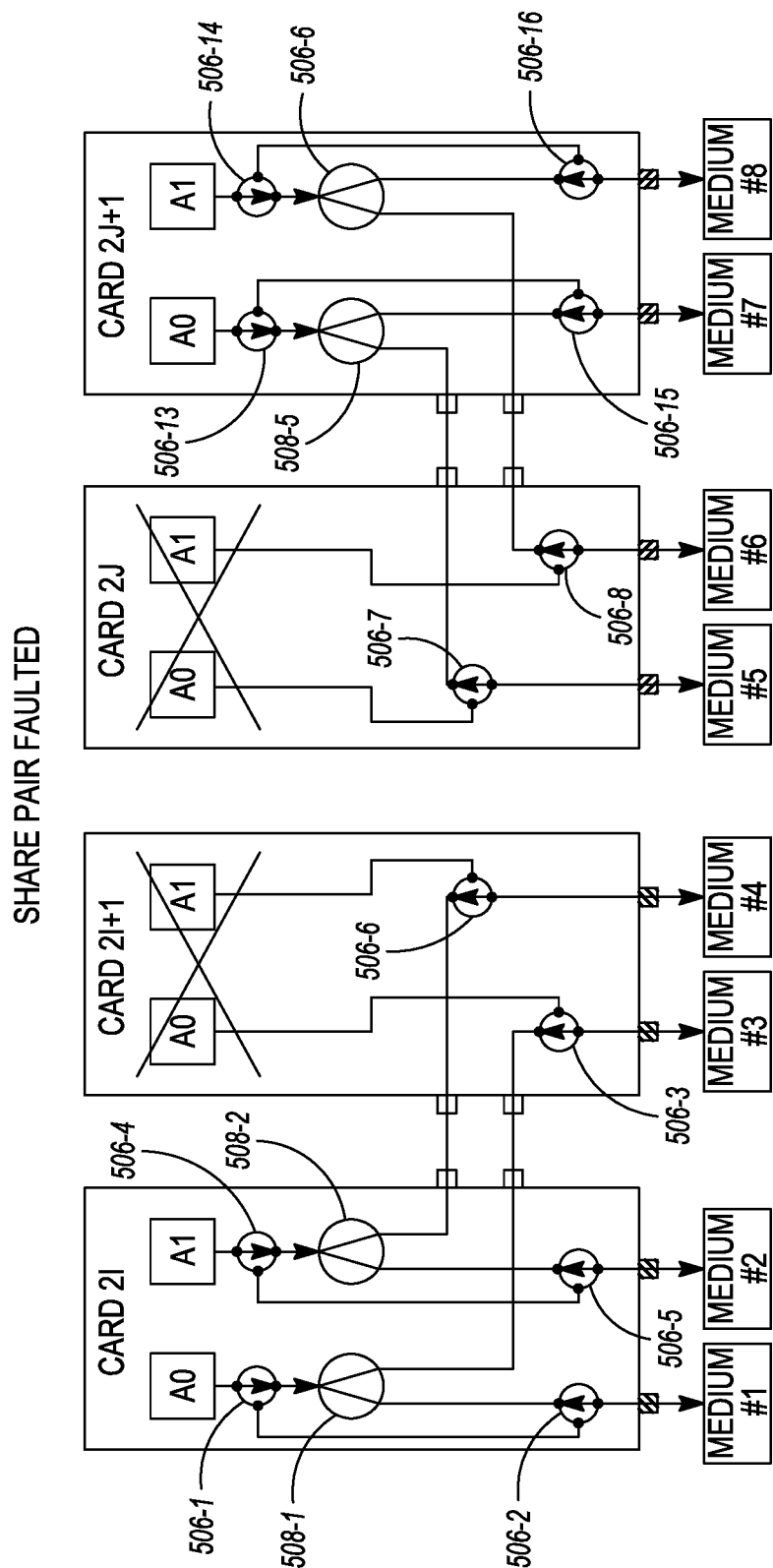
FIG. 5F depicts an example of a share pair N+0 sharing architecture according to one embodiment.

FIG. 5F depicts an example of a share pair N+0 sharing architecture according to one embodiment. In this case, cards are paired into 1:1 failure groups that can share for each other. Cards #2I and #2I+1 are one share pair and cards #2J and #2J+1 are another pair. Cards in one failure group do not share with cards in another failure group.

For the first pair, card #2I+1 has failed. In this case, transmitter #A0 of card #2I is used to service medium #1 and medium #3. Transmitter #A1 of card #2I is used to service medium #2 and medium #4.

For transmitter #A0 of card #2I, controller 108 switches the output of switch 506-1 from the input of switch 506-2 to the input of splitter 508-1. The outputs of splitter 508-1 are coupled to the input of switch 506-2 and switch 506-3. In this case, switches 506-2 and 506-3 have been switched to the output of splitter 508-1. Then, transmitter #A0 of card #2I can then service medium #1 and medium #3. For transmitter #A1, switches 506-4, 506-5, and 506-6 are similarly switched. In this case, transmitter #A1 of card #2I can then service medium #2 and medium #4. Other configurations may also be appreciated as described herein, such as transmitter #A1 of card #2I servicing both mediums #3 and #4 while transmitter #A0 of card #2I services medium #1 and medium #2.

For cards #2J and #2J+1, switches 506-7, 506-8, 506-15, and 506-16 are similarly switched such that transmitter #A0 of card #2J+1 services medium #5 and medium #7 and transmitter #A1 of card #2J+1 services medium #6 and medium #8.

In the above configurations, two transmitters failed on a card. However, it is possible for only one transmitter to fail. In this case, all of the configurations except share pair can be used to compensate for the failed transmitter.

Each of the different sharing configurations will not be described. Not all possible configurations for each sharing configuration will be described. However, it is possible for a six-slot chassis example to have 2 connector, 4 connector, fully equipped chassis, and partially equipped chassis configurations.

Share Bi-Directional

Share Bi-Directional-2 Input Connector-Fully-Equipped Architecture

Figure 6A:
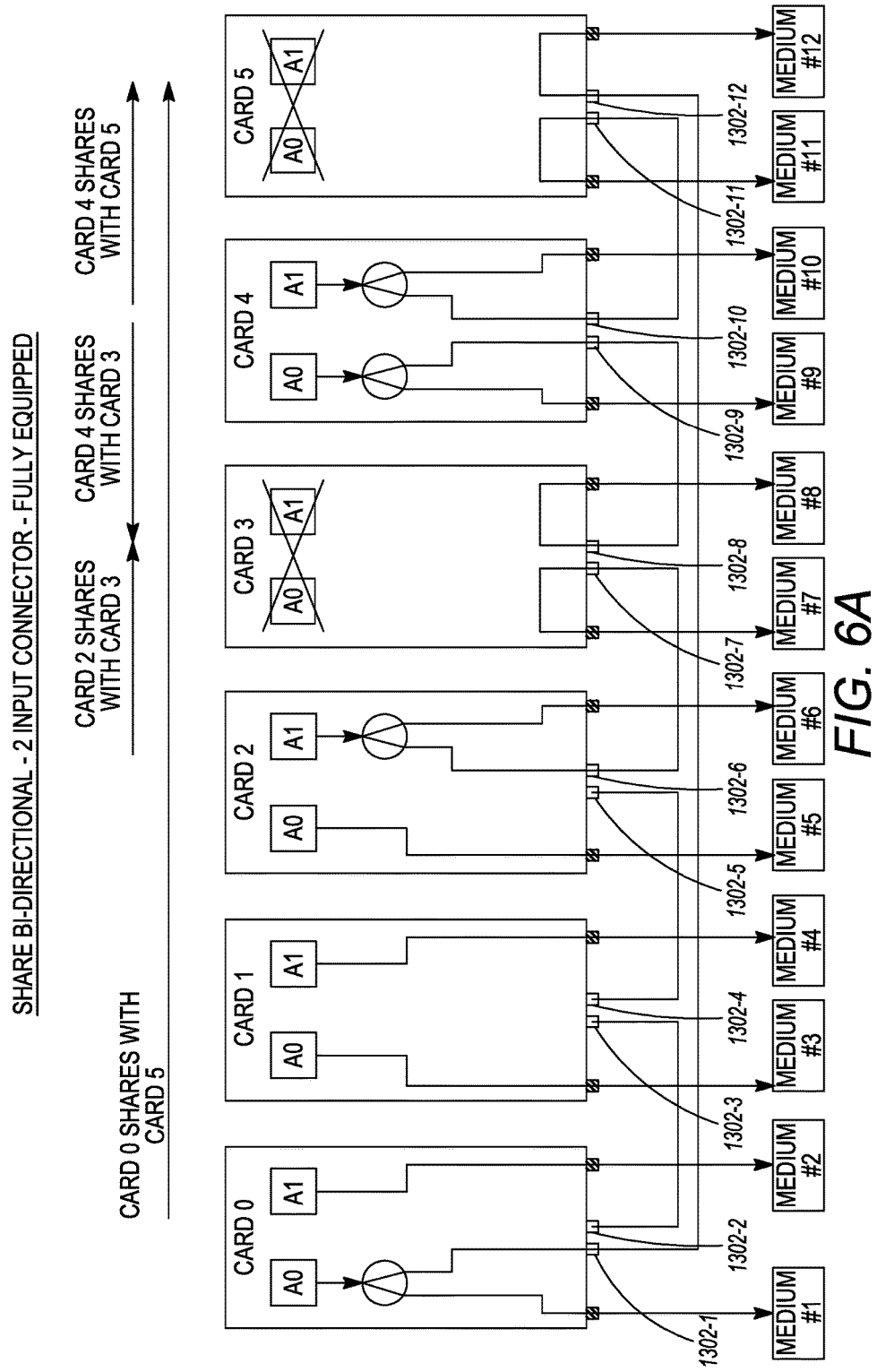
FIG. 6A depicts an example of a share bi-directional 2 input connector fully-equipped architecture according to one embodiment.

FIG. 6A depicts an example of a share bi-directional 2 input connector fully-equipped architecture according to one embodiment. In this case, the chassis includes six slots and the six slots have been filled with cards #0-#5. Cards #0-#5 service mediums #1-#12. For example, each card includes a pair of transmitters (#A0 and #A1) that respectively service a pair of mediums with a single transmitter servicing a single medium. Each card has two output connectors that connect outbound signals to mediums and two input connectors 1302 that receive signals from other cards or output signals to other cards. For example, this architecture uses two input connectors 1302 for each card from input connectors 1302-1-1302-12. There is also no dedicated spare. In this case, there is splitter loss, multiple hops, and there might be sharing across a full backplane.

As shown, card #0 shares with card #5, card #2 shares with card #3, card #4 shares with card #3, and card #4 shares with card #5. In this case, there is a bi-directional sharing with card #2 and card #4 sharing with card #3, and, there is a bi-directional sharing with card #4 and card #0 sharing with card #5. These schemes were described at least in FIG. 5C and thus are not described in more detail here.

Figure 6B:
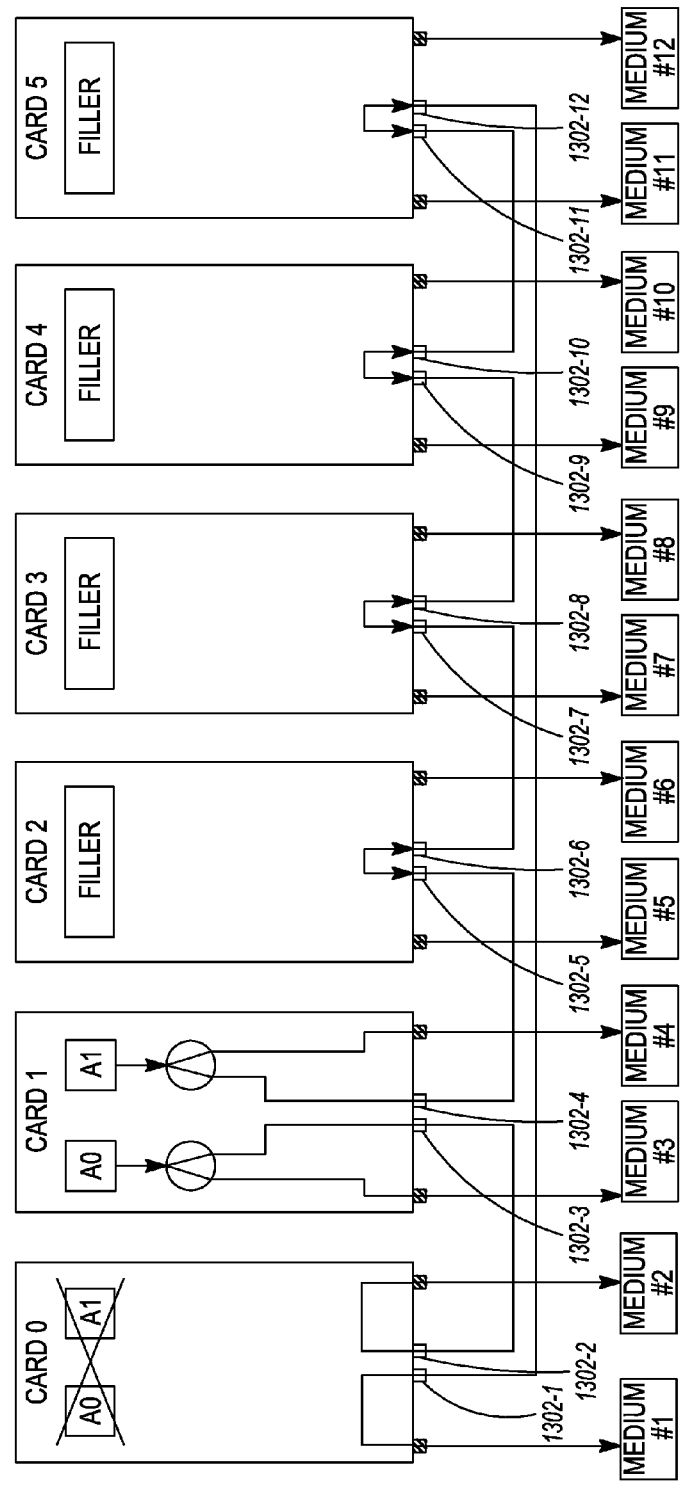
FIG. 6B depicts an example of a share bi-directional 2 input connector with partially-equipped architecture according to one embodiment.

FIG. 6B depicts an example of the share bi-directional 2 input connector with partially-equipped architecture according to one embodiment. In this case, card #1 shares with card #0 bi-directionally to both the left and right. This includes no dedicated spare with two input connectors 1302 for each card. There is splitter loss, multiple hops that might share across a full backplane. This example was described above at least with respect to FIG. 5C.

Share Bi-Directional-2 Input Connector-Functional and Switch View

FIGS. 7A-7F depict an example of the share bi-directional 2 input connector functional and switch views according to one embodiment. FIG. 7A depicts the normal functional view and FIG. 7B shows the switch view in the normal operation according to one embodiment. In FIG. 7A, transmitter #A0 and transmitter #A1 transmit to medium #1 and medium #2, respectively, through output connector 1402-1 and output connector 1402-2, respectively. Input connectors 1408-1 and 1408-2 are not used.

In the normal view in FIG. 7B, transmitter #A0 communicates through switch 1404-1 which has its output switched to the N output. Switch 1404-2 also has its input switched to the N input. This couples transmitter #A0 to output connector 1402-1. For transmitter #A1, switch 1404-2 and switch 1404-3 are switched similarly to couple transmitter #A1 to output connector 1402-2. These output connectors are coupled to separate mediums, such as medium #1 and medium #2.

FIGS. 7C and 7D show the sharing functional view and switch view when the card is sharing, respectively, according to one embodiment. FIG. 7C depicts the functional view according to one embodiment. In this case, transmitter #A0 transmits through splitter 1406-1 to output connector 1402-1 and input connector 1408-1. Also, transmitter #A1 transmits through splitter 1406-2 to input connector 1408-2 and output connector 1402-2. In this case, each transmitter services its own medium and another medium of a failed card.

FIG. 7D depicts the switch view for the sharing card according to one embodiment. In this case, controller 108 switches the output of switch 1404-1 to the S output. This allows transmitter #A0 to couple to splitter 1406-1. Also, controller 108 switches the input of switch 1404-2 to the S input and the input of switch 1404-4 to the S input. This couples output connector 1402-1 and input connector 1408-1 to splitter 1406-1.

For transmitter #A1, controller 108 switches the output of switch 1404-2 to the S output to couple transmitter #A1 to splitter 1406-2. Also, controller 108 switches the inputs of switch 1404-5 and switch 1404-3 to the S input. This couples transmitter #A1 to input connector 1408-2 and output connector 1402-2.

FIGS. 7E and 7F show the functional view and the switch view when the card is faulted according to one embodiment. In this case, the transmitters of the failed card are disconnected from the output connectors 1402.

In FIG. 7E, transmitter #A0 and transmitter #A1 are faulted and input connector 1408-1 has been connected to output connector 1402-1 and input connector 1408-2 has been connected to output connector 1402-2. This connects a first signal from another transmitter of another card to output connector 1402-1 and a second signal from another transmitter to output connector 1402-2.

In FIG. 7F, the input connector is routed to the output connector. For example, switch 1404-4 is switched to the F input and switch 1404-2 is switched to the F output. Switches 1404-5 and 1404-3 are similarly switched to the F inputs.

Share Bi-Directional-Dual Loop

Figure 8A:
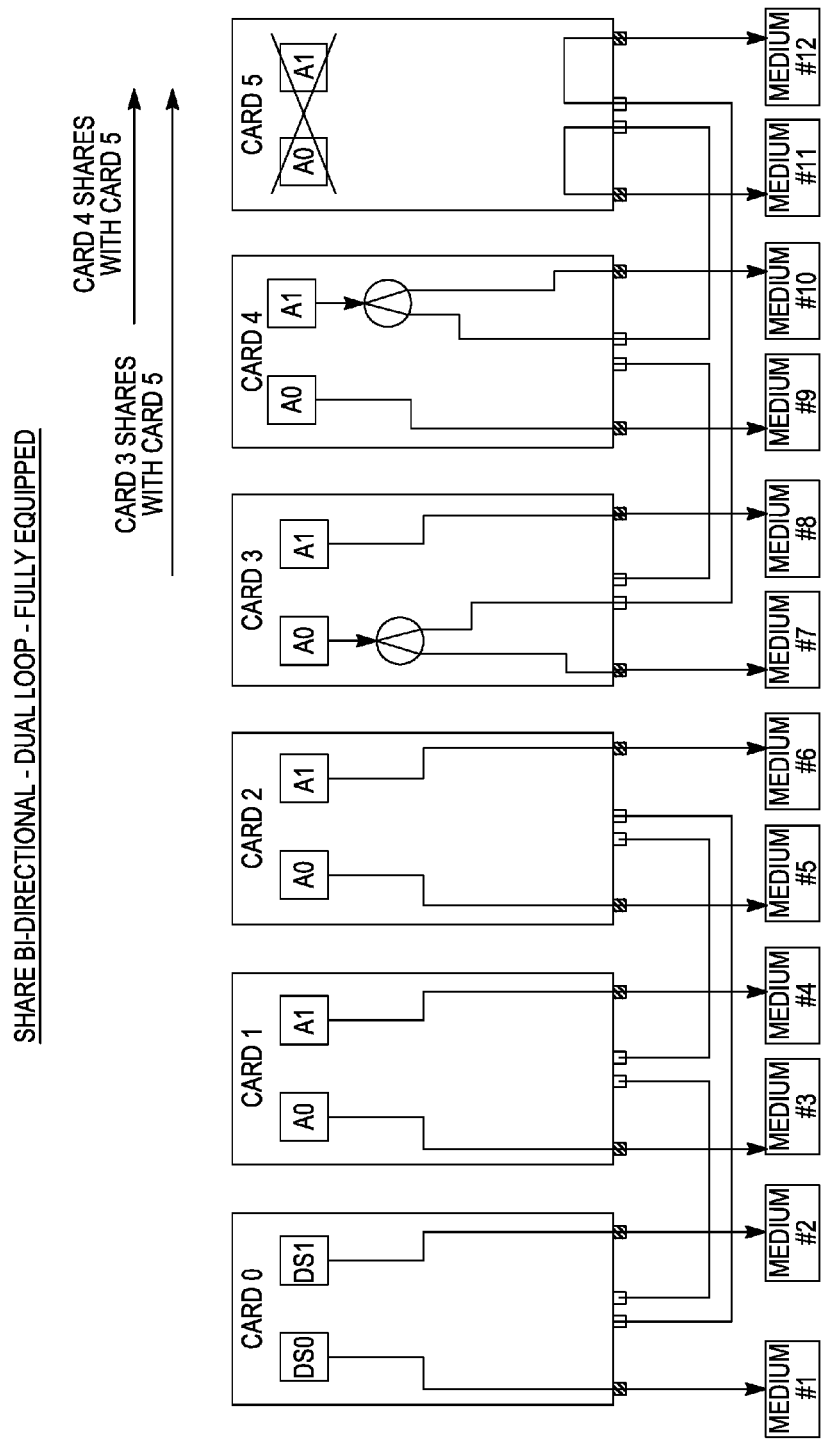
FIG. 8A depicts an example of a share bi-directional dual loop fully-equipped architecture according to one embodiment.
Figure 8B:
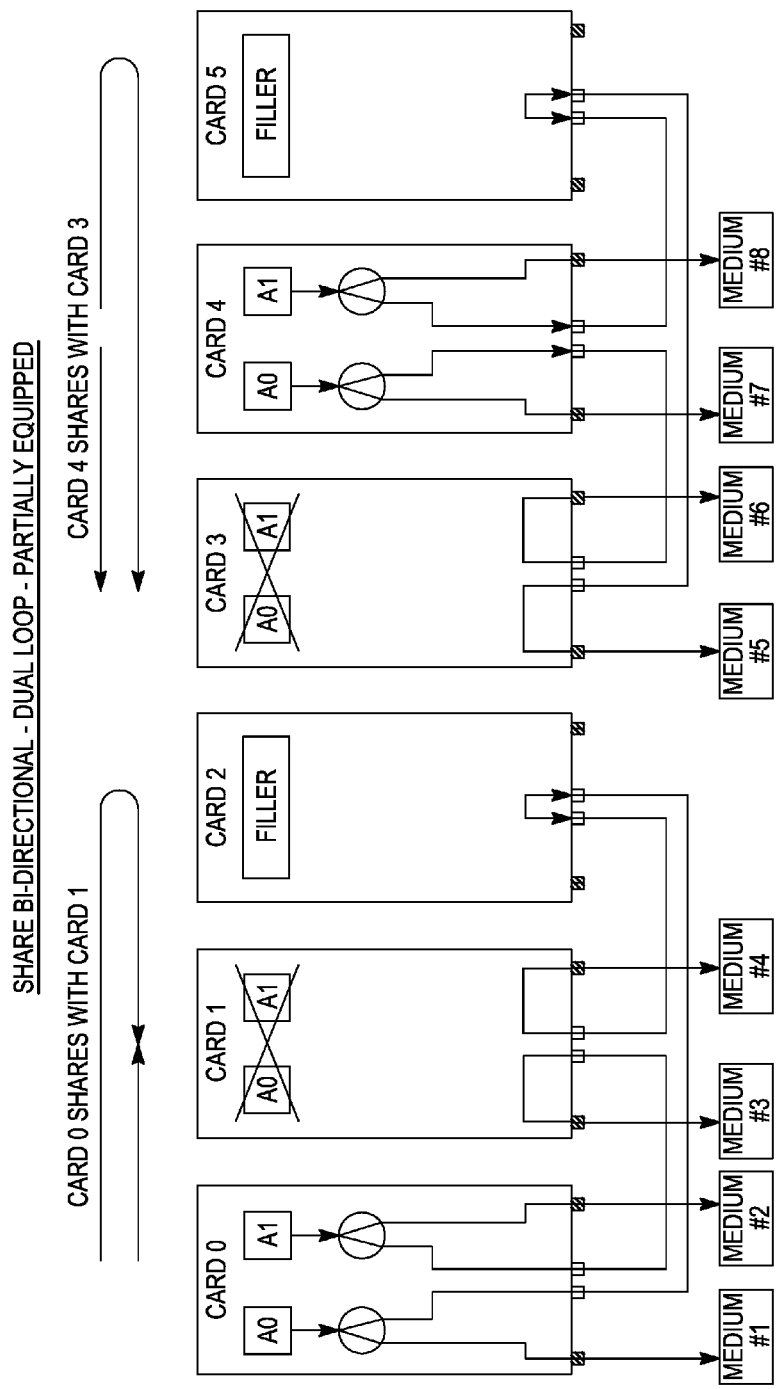
FIG. 8B depicts an example of a share bi-directional dual loop partially-equipped architecture according to one embodiment.

FIG. 8A-8B depict examples of the share bi-directional dual loop architectures. FIG. 8A depicts an example of a share bi-directional dual loop fully-equipped architecture according to one embodiment. In this embodiment, there is a maximum single hop length that is half of the backplane. Configuration rules are used to enforce no sharing between halves. That is, cards #0, #1, and #2 do not share with cards #3, #4, and #5. In this case, when card #5 fails, transmitter #A0 of card #3 compensates for transmitter #A1 of card #5 and transmitter #A1 of card #4 compensates for transmitter #A0 of card #5. The switching in this case is similar to that as discussed above with respect to at least FIG. 5C and will not be discussed in further detail.

FIG. 8B depicts an example of a share bi-directional dual loop partially-equipped architecture according to one embodiment. This architecture includes a maximum single hop length for half of the backplane. Configuration rules account for no sharing between halves. That is, cards #0-#2 form one half and cards #3-#5 form another half Cards for one half do not share with cards from another half. Also, a filler card is provided in each half.

As seen, card #0 shares with card #1 through filler card #2. In this case, active card #0 shares with card #1. In one example, transmitter #A0 of card #0 shares with transmitter #A1 of card #1 through filler card #2. Also, transmitter #A1 of card #0 shares with transmitter #A0 of card #1 directly. Similarly, card #4 shares with card #3. The switching scheme may be similar to that described above with respect to at least FIG. 5C.

Share Bi-Directional-4 Input Connector

Figure 9A:
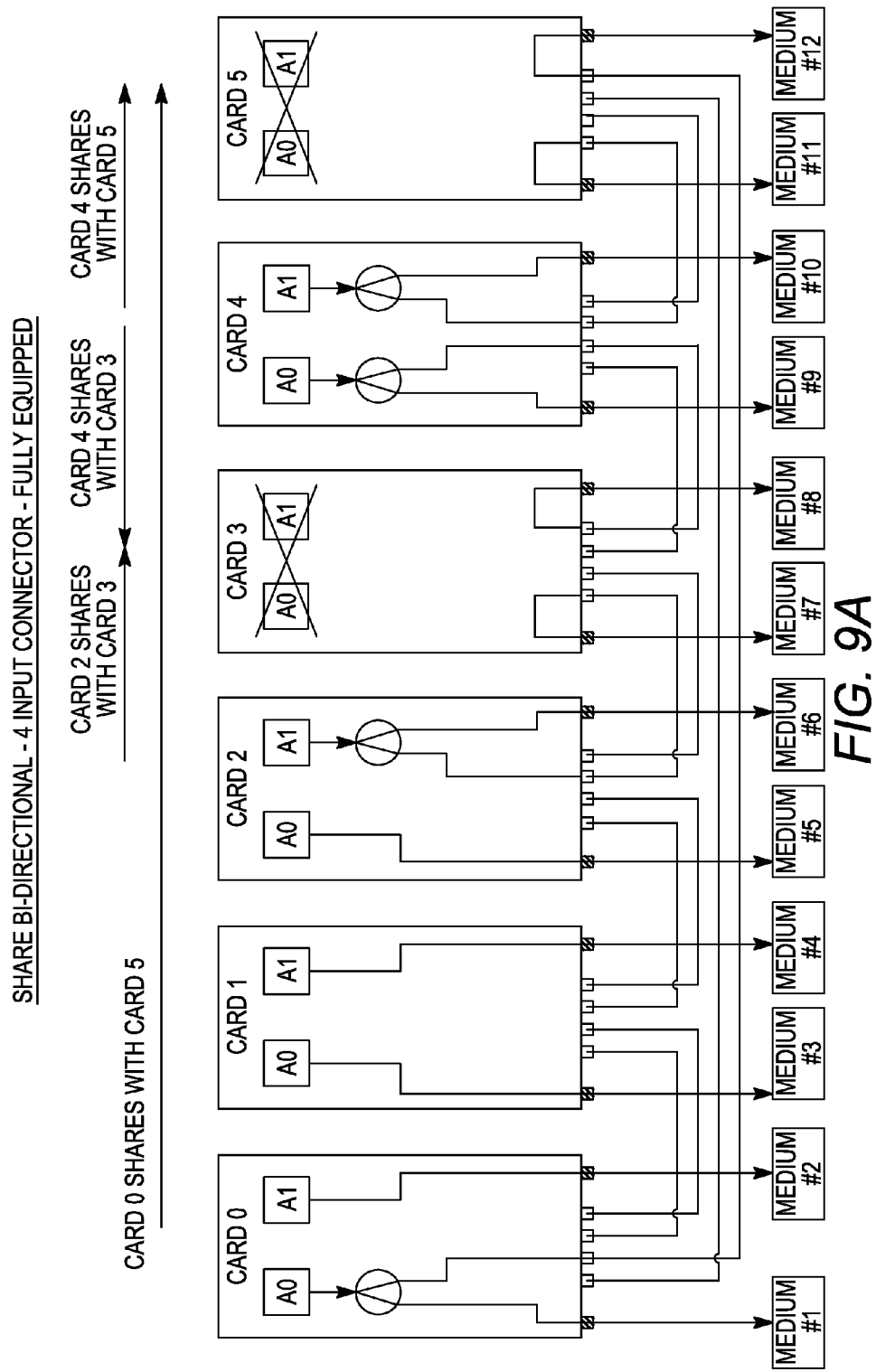
FIG. 9A depicts an example of a share bi-directional 4 input connector fully-equipped architecture according to one embodiment.

FIG. 9A depicts an example of a share bi-directional 4 input connector fully-equipped architecture according to one embodiment. This architecture requires fewer switches than share bi-directional 2 input connector example, but requires more input connectors for sharing than the share bi-directional 2 input connector architecture. In this architecture, card #0 shares with card #5, card #2 shares with card #3, card #4 shares with card #3, and card #4 shares with card #5. When card #3 experiences a failure, bi-directional sharing with card #2 and card #4 occurs as was described above with respect to at least FIG. 5C. The same is true when card #5 fails as card #4 and card #0 share with card #5.

Figure 9B:
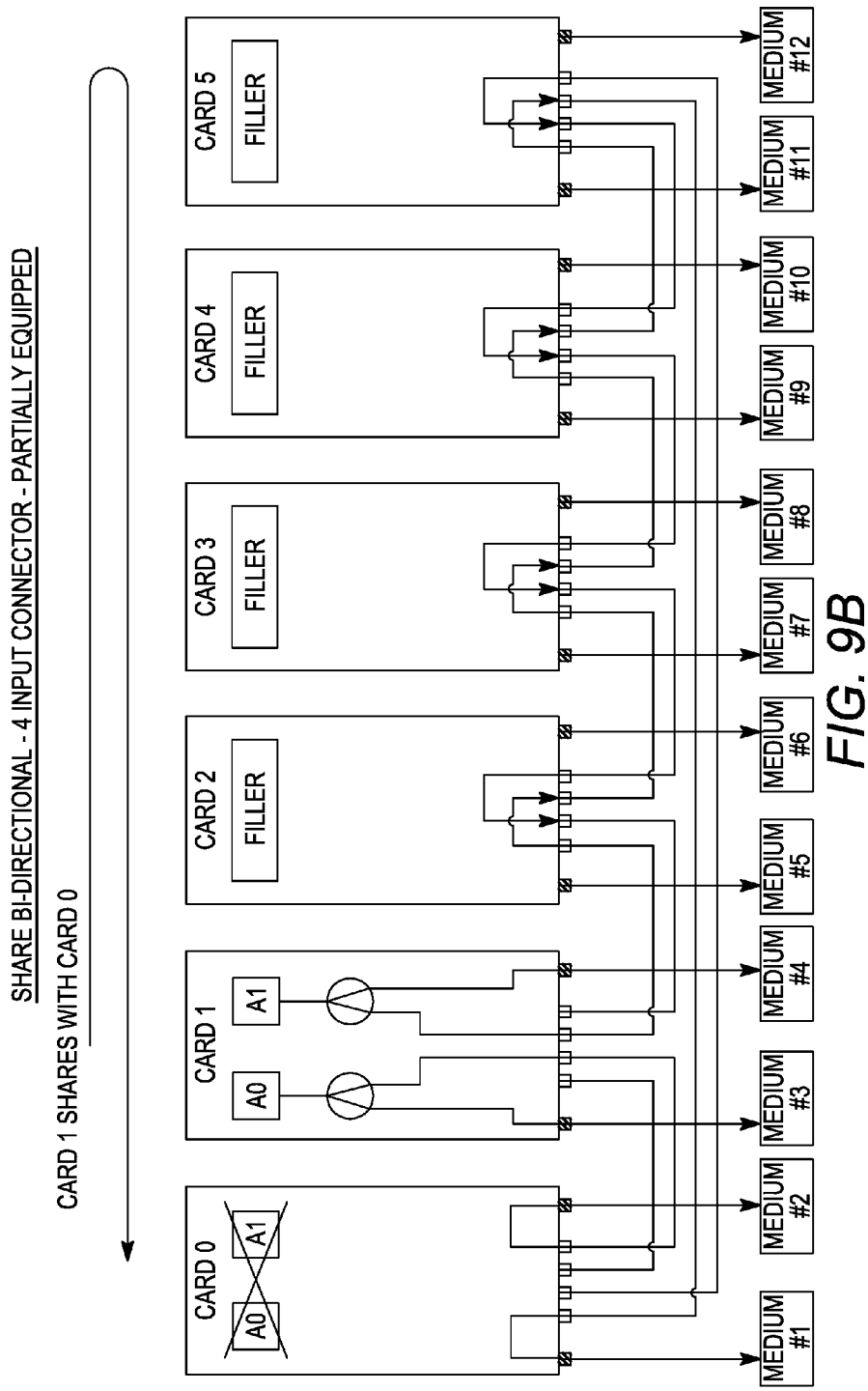
FIG. 9B depicts an example of a share bi-directional 4 input connector partially-equipped architecture according to one embodiment.

FIG. 9B depicts an example of a share bi-directional 4 input connector partially-equipped architecture according to one embodiment. This requires fewer switches than share bi-directional 2 input connector, but requires more input connectors than the share bi-directional 2 input connector architecture. In this case, card #1 shares with card #0. When card #0 fails, transmitter #A0 of card #1 shares with card #0. Also, transmitter #A1 of card #1 can share with card #0 through filler cards #2-#5. The switching will not be described in more detail but a person skilled in the art will appreciate.

Share Bi-Directional-4 Input Connector-Functional View and Switch View

FIGS. 10A-10F depict an example of the share bi-directional 4 input connector functional and switch views according to one embodiment. FIG. 10A depicts the functional view of a normal card and FIG. 10B shows a switch view of a normal card. In FIG. 10A, transmitter #A0 is transmitting through an output connector 1702-1 and transmitter #A1 is transmitting through an output connector 1702-2.

In FIG. 10B, switch 1704-1 has its output coupled to the N output and switch 1704-2 is switched to the N output to couple transmitter #A0 to output connector 1702-1. The same is true for switches 1704-3 and 1704-4 to couple transmitter #A1 to output connector 1702-2.

FIG. 10C depicts a functional view for an architecture for a sharing card according to one embodiment. In this case, transmitter #A0 is coupled to output connector 1702-1 and input connector 1708-1 through splitter 1706-1. Further, transmitter #A1 is coupled to output connector 1702-2 and input connector 1708-2 through splitter 1706-2.

FIG. 10D depicts the switch view for the sharing card according to one embodiment. In this case, switch 1704-1 and switch 1704-2 have been switched to the S output and input, respectively. This couples transmitter #A0 to splitter 1706-1 and to both output connector 1702-1 and input connector 1708-1. Further, the same is true for switches 1704-3 and 1704-4 which have been switch to the S output and S input, respectively. This couples transmitter #A1 to output connector 1702-2 and input connector 1708-2.

FIG. 10E depicts an example of the functional view for a faulted card according to one embodiment. In this case, an input connector 1708-3 is connected to output connector 1702-1 and an input connector 1708-4 is coupled to output connector 1702-2.

FIG. 10F depicts the switch view of the faulted card according to one embodiment. Switches 1704-2 and 1704-4 have their input switched to the F output. In this case, transmitter #A0 and transmitter #A1 are not coupled to any output connectors. This couples input connectors 1708-3 and 1708-4 to output connectors 1702-1 and 1702-2 respectively.

Share Split

The following will describe some examples of the share split architecture. Not all of the examples will be described, but the share split architecture may be configured in all of those architectures as described above with respect to the share bi-directional architecture.

Share Split-Fully Equipped Chassis

Figure 11A:
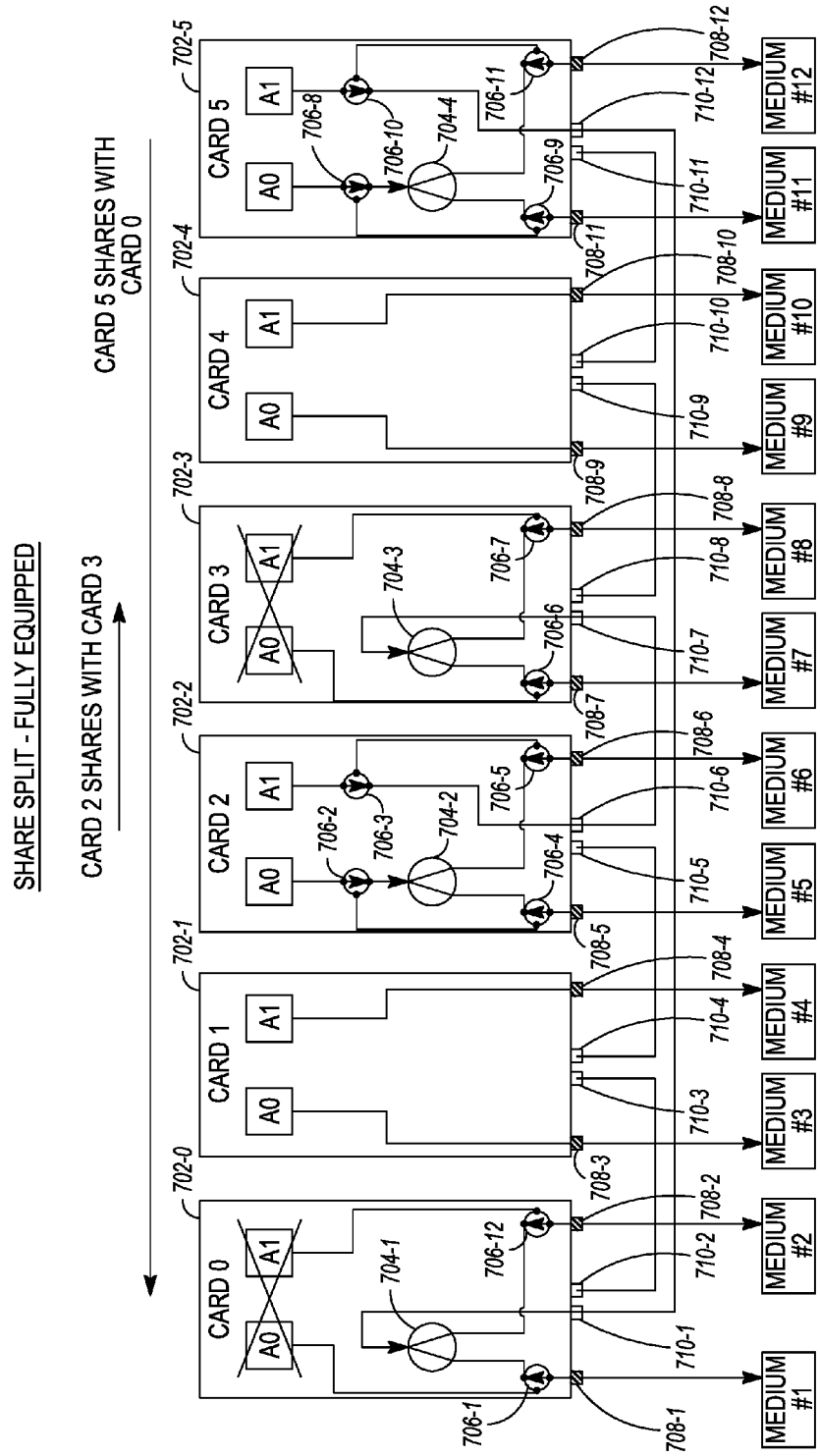
FIG. 11A depicts an example of a share split fully-equipped architecture according to one embodiment.

FIG. 11A depicts an example of a share split fully-equipped architecture according to one embodiment. In this sharing scheme, when a failure occurs, another card services the two mediums of the failed card using a single transmitter. Then, a transmitter of the sharing card is used to service both mediums being serviced by that card. In this example, card #2 shares with card #3 when card #3 fails and card #5 shares with card #0 when card #0 fails.

When card #0 fails, controller 108 configures switch network 104 such that card #5 compensates for failed card #0. In this case, transmitter #A1 of card #5 is used to service medium #1 and medium #2. Transmitter #5 no longer services medium #12 in this case. To perform the reconfiguration, the output of switch 706-8 is switched from the input of switch 706-9 to the input of splitter 704-4. Also, the input of switch 706-9 is switched to the output of splitter 704-4 and the input of switch 706-11 is switched to the other output of splitter 704-4. In this case, transmitter #A0 of card #5 is now servicing medium #11 and medium #12 through output connectors 708-11 and 708-12.

Controller 108 then reconfigures switch network 104 such that transmitter A1 of card #5 services medium #1 and medium #2. The output of switch 706-10 is switched from the input of switch 706-11 to input connector 710-12. Input connector 710-12 is coupled to input connector 710-1 of card #0. From input connector 710-1, the signal is coupled to splitter 704-1. Also, the input of switch 706-1 is switched to the output of splitter 704-1 from transmitter A0 of card #0. And the input of switch 706-12 is switched to the other output of splitter 704-1 from transmitter #A1 or card #0. Thus, medium #1 and medium #2 are now being serviced by transmitter #A1 of card #5 through output connectors 708-1 and 708-2.

For failed card #3, card #2 similarly is used to share service. For example, controller 108 configures switch network 104 such that transmitter #A1 of card #2 services medium #7 and medium #8 of card #3. Also, controller 108 configures switch network 104 such that transmitter #A0 of card #2 services medium #5 and medium #6 of card #2. For the reconfiguration, switches 706-2, 706-4, and 706-5 are switched such that splitter 704-2 sends signals from transmitter #A0 to both switches 706-4 and 706-5. Output connectors 708-5 and 708-6 are then coupled to transmitter #A0 of card #2, and medium #5 and medium #6 are serviced by transmitter #A0. Further, switches 706-3, 706-6, and 706-7 are switched such that transmitter #A1 is coupled through input connector 710-6 and input connector 710-7 to splitter 704-3. Then, the outputs of splitter 704-3 are coupled to switches 706-6 and 706-7, which have their inputs switched from transmitters #A0 and #A1 of card #3, respectively, to the outputs of splitter 704-3. Transmitter #A1 of card #2 now services medium #7 and medium #8 through output connectors 708-7 and 708-8.

Share Split-Partially Equipped Chassis

Figure 11B:
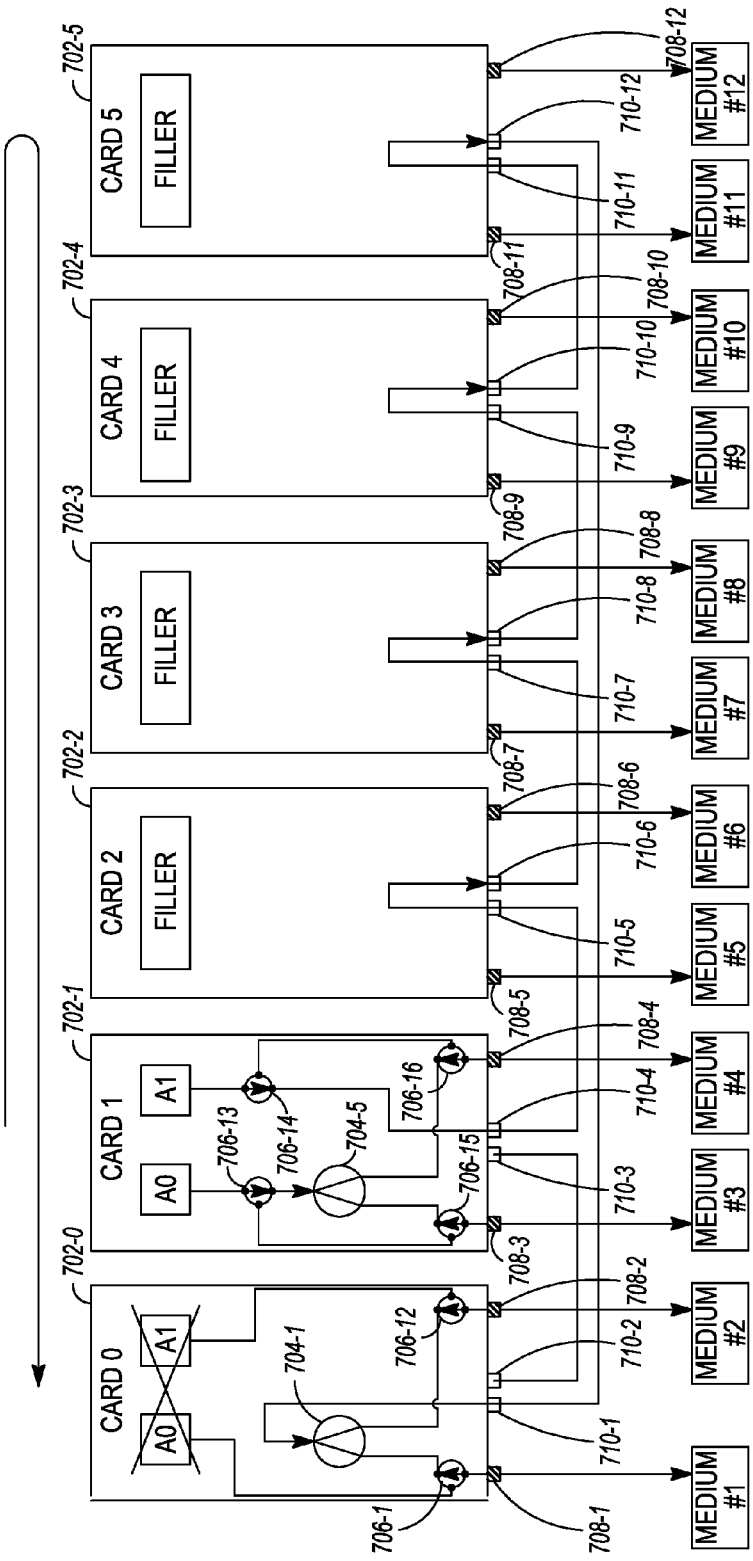
FIG. 11B depicts an example of a share split partially-equipped architecture according to one embodiment.

FIG. 11B depicts an example of a share split partially-equipped architecture according to one embodiment. Active cards, such as card #0 and card #1, are included in slots #0 and #1, respectively. Slots #2-#5 do not have active cards but include filler cards 702-2-702-5 instead. The filler cards include input connectors and sharing paths that allow one of the active cards to share service with a failed card though the input connectors.

In this example, card #0 has failed and card #1 shares with card #0. For example, transmitter #A0 of card #1 services medium #3 and medium #4 and transmitter #A1 of card #1 services medium #1 and medium #2. Transmitter #A1 of card #1 does not service medium #4 anymore and thus transmitter #A0 of card #1 is configured to service medium #3 and medium #4. The path from transmitter #A1 of card #1 may go through the filler cards to card #0. Other paths may also be appreciated. Additionally, transmitter #A0 of card #1 may be used to compensate for failed card #0 instead of transmitter #A1.

To perform sharing with card #0, controller 108 reconfigures the output of switch 706-14 is changed from the input of switch 706-15 to input connector 710-4. Then, the signal is routed through input connectors 710-5, 710-6, 710-7, 710-8, 710-9, 710-10, 710-11, 710-12 and then back to input connector 710-1 of card #0. This may be through the backplane, which requires the connection to go in this direction. Then, splitter 704-1 splits the signal to output connectors 708-1 and 708-2. To couple splitter 704-1 to medium #1 and medium #2, the input of switches 706-1 and 706-12 are switched to the outputs of splitter 704-1. Transmitter #A1 of card #1 is now servicing medium #1 and medium #2.

Since transmitter #A1 of card #1 is no longer servicing medium #4, switches 706-13, 706-15, and 706-16 are switched such that the signal from transmitter #A0 of card #1 flows through splitter 704-5 to medium #3 and medium #4.

Share Single

The following will describe some examples of the share single architecture. In this architecture with this two transmitter example, only transmitter #A0 is used for sharing, never transmitter #A1. This allows the minimum amount of splitters and switches and additional card resources needed when both transmitters can be sharing. Not all of the examples will be described, but the share single architecture may be configured in all of those architectures described with respect to the share bi-directional architecture.

Share Single-4 Input Connector-Fully Equipped

Figure 12A:
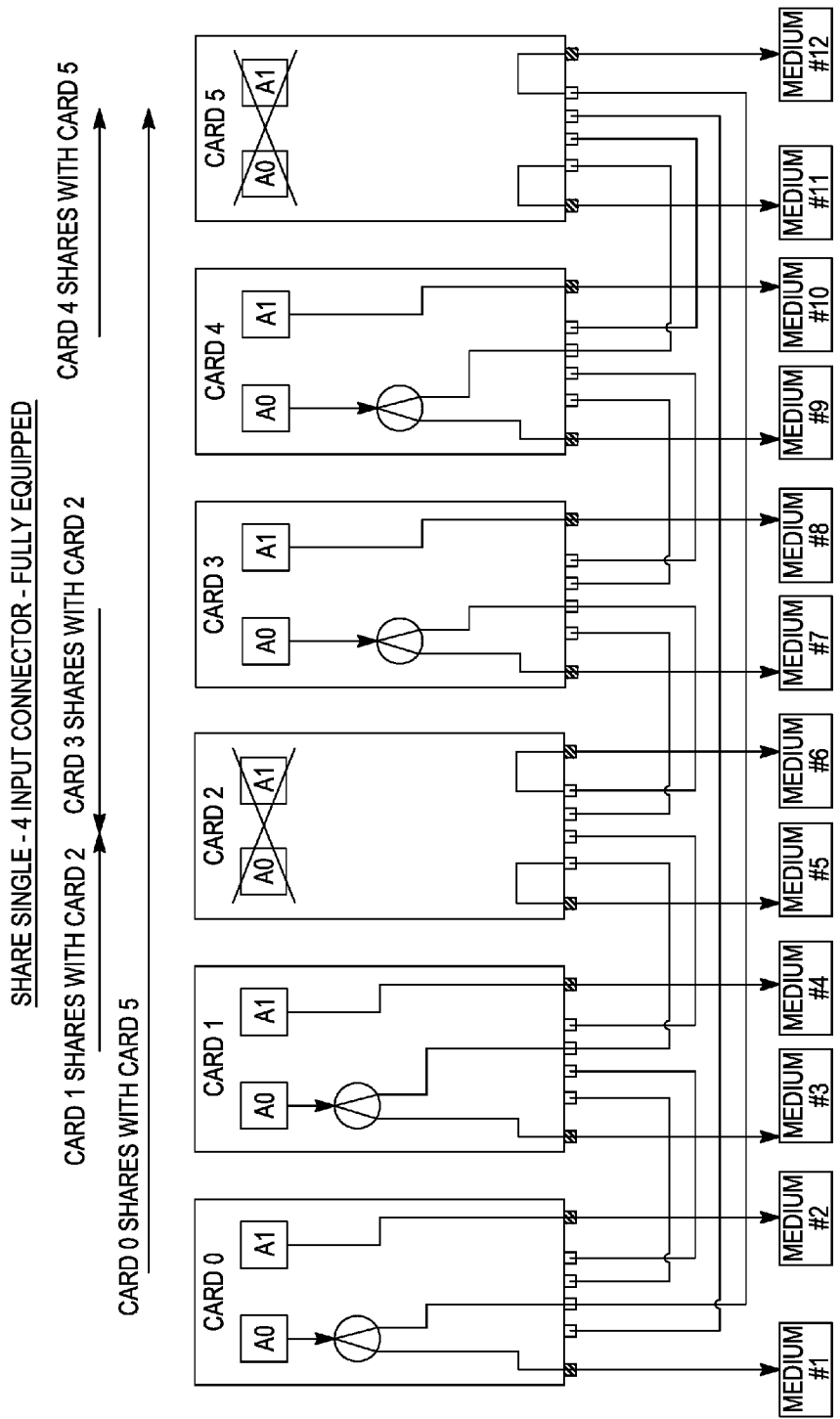
FIG. 12A depicts an example of a share single 4 input connector fully-equipped architecture according to one embodiment.

FIG. 12A depicts an example of a share single 4 input connector fully-equipped architecture according to one embodiment. In this architecture, the minimum equipment needed is three cards. This sharing is similar to the bi-directional sharing as described above with respect to at least FIG. 5D. However, what is different with share single compared to share bi-directional is that the output of the sharing splitter is able to be connected to two different outputs—depending if it is sharing to the right or to the left. In the bi-directional architecture, transmitter #A0 is used to share to the left and transmitter #A1 is used to share to the right. For failed card #5, transmitter #A0 of card #0 shares with medium #12. Also, transmitter #A0 of card #4 shares with medium #11. For failed card #2, transmitter A0 of card #1 shares with medium #5 and transmitter #A0 of card #3 shares with medium #6.

Share Single-4 Input Connector-Partially-Equipped

Figure 12B:
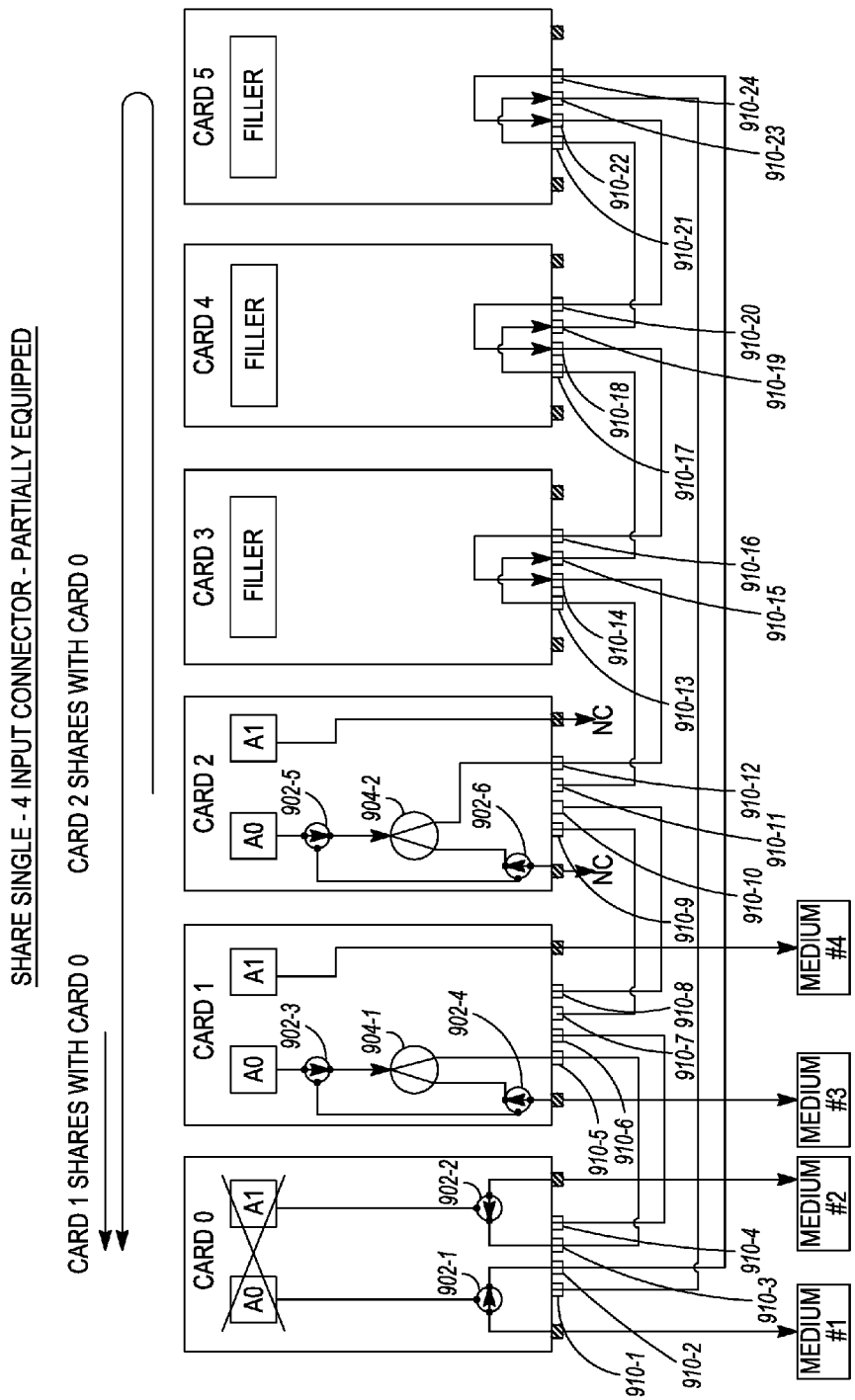
FIG. 12B depicts an example of a share single 4 input connector partially-equipped architecture according to one embodiment.

FIG. 12B depicts an example of a share single 4 input connector partially-equipped architecture according to one embodiment. Cards #0-#1 are active and card #2 is used only for sharing and does not transmit to any medium. In this case, card #2 is the same design as card #0 and card #1 and uses a splitter to provide service to faulted card #0. Because the share single architecture always shares one transmitter from 2 different cards, two sharing cards are needed, which is why card #2 is included to share service. Cards #3, #4, and #5 are filler cards that provide sparing paths. However, these cards do not transmit to any mediums or perform any sparing.

In this case, card #1 shares with card #0 and card #2 shares with card #0. So only one transmitter #A1 of card #1 shares with one medium of card #0. The other medium is serviced by card #2.

When card #0 fails, transmitter #A0 of card #1 and transmitter #A0 of card #2 are used to compensate for the transmitters of card #0. In one embodiment, transmitter #A0 is a "share left" in that card #1 shares to the left and card #2 is a "share right" in that card #2 shares to the right.

For card #1, the path from transmitter #A0 goes through switch 902-3 to splitter 904-1. In this case, the output of switch 902-3 is switched from being connected to the input of switch 902-4 to the input of splitter 904-1. The path continues through input connector 910-5 to input connector 910-3 of card #0. The output of switch 902-2 is switched to input connector 910-3 from transmitter #A1 of card #0. Transmitter #A0 now services medium #2 and medium #3.

For card #2, transmitter #A0 shares for transmitter #A0 of card #0. Switches 902-5 and 902-6 and splitter 904-2 operate in the same manner as described with respect to card #1. However, the path from splitter 904-2 to card #0 goes through input connectors 910-12, 910-14, 910-16, 910-18, 910-20, 910-22, 910-24 to input connector 910-2 of card #0. Then, the signal is sent through switch 902-1 whose input is switched to be connected to input connector 910-3. Thus, transmitter #A0 of card #2 is coupled to medium #1.

As will be described later in FIG. 12D, this chassis has the same configuration as the partially equipped chassis of FIG. 12D except that cards in FIG. 12B have 4 input connectors 910. Using 4 input connectors means that fewer switches may be used from the share single 2 implementation. However, as noted, more input connectors 910 are needed. That is, 4 input connectors are needed instead of 2. Because 4 input connectors are used, card #2 can spare for either card #0 or card #1. Fewer switches are needed to perform the connections for sharing or sparing. In the 2 input connector example, more switches would be needed to perform sparing or sharing.

Share Single-2 Input Connector-Fully Equipped

Figure 12C:
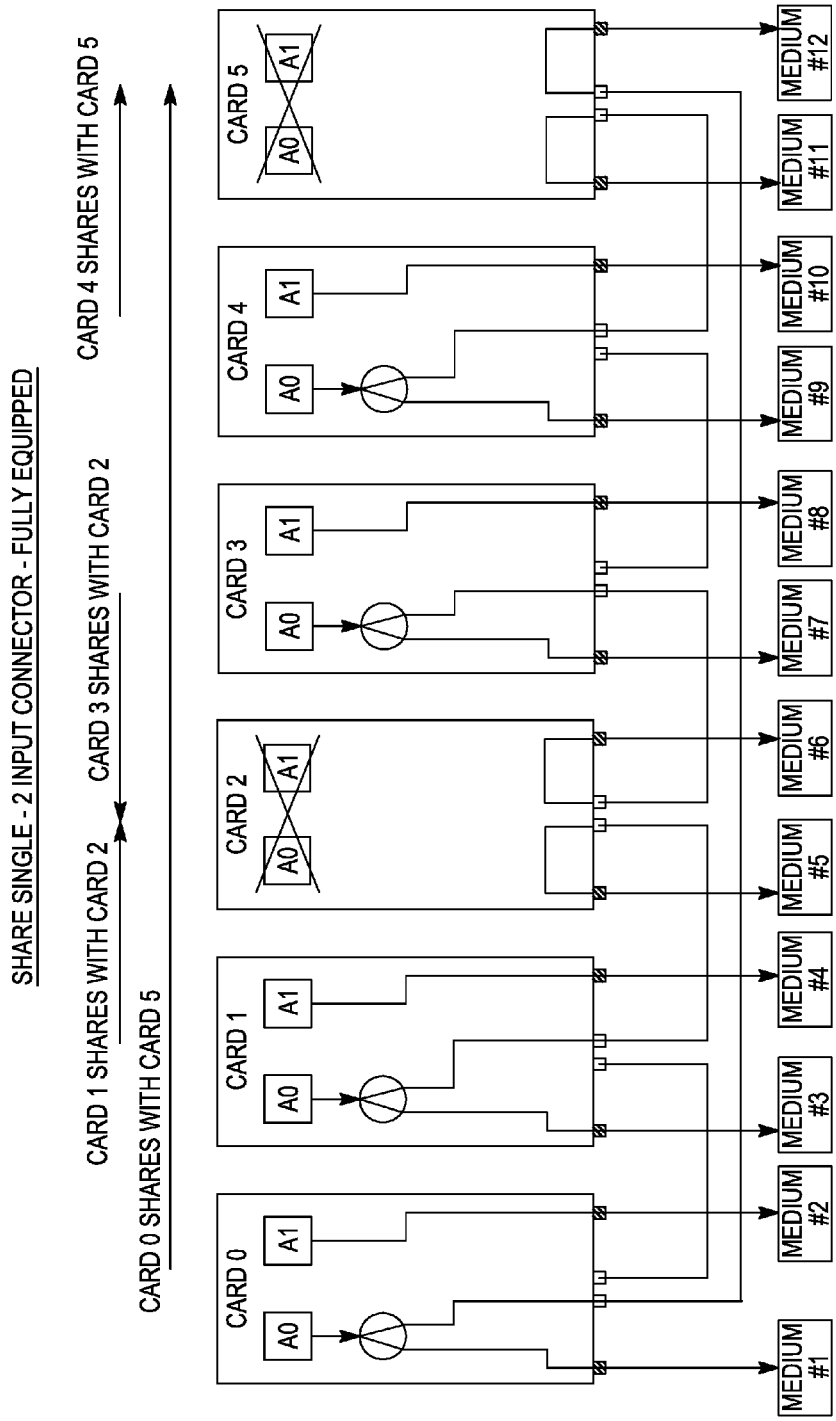
FIG. 12C depicts an example of a share single 2 input connector fully-equipped architecture according to one embodiment.

FIG. 12C depicts an example of a share single 2 input connector fully-equipped architecture according to one embodiment. In this architecture, the 2 input connector version requires less connectors, but more switches than the 4 input connector version. Also, an extra sharing output minimizes the negatives of an extra amplifier. The minimum equipment needed is three cards in this case.

In this example, card #2 and card #5 have failed. Card #1 shares with card #2 and card #3 shares with card #2. Also, card #0 shares with card #5 and card #4 shares with card #5. In this case, only a single transmitter in the card, such as transmitter #A0, is used for sharing. The switching is as described above with respect to at least FIG. 5D and will not be described again.

Share Single-Partially Equipped-2 Input Connector

Figure 12D:
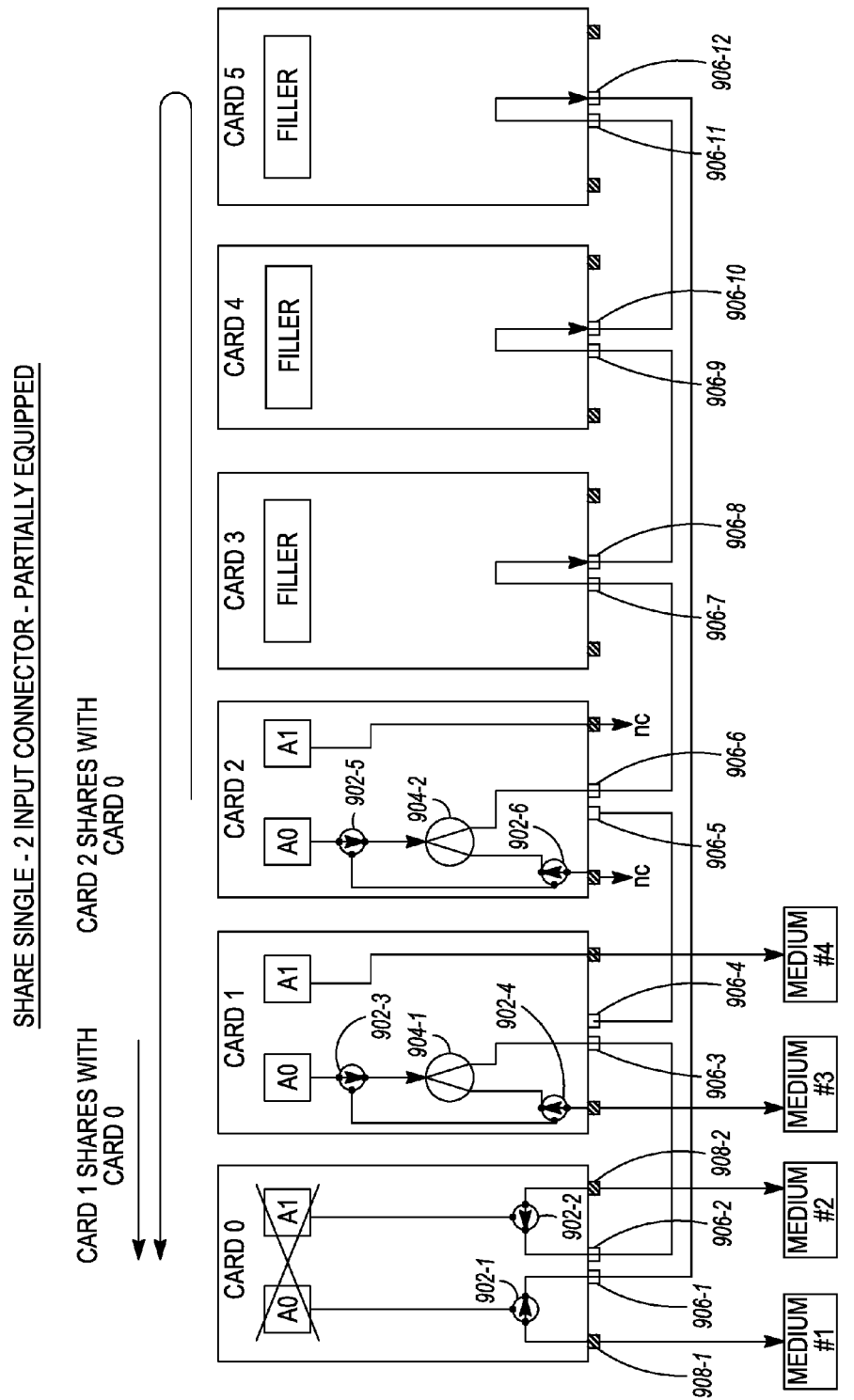
FIG. 12D depicts an example of a share single 2 input connector partially-equipped architecture according to one embodiment.

FIG. 12D depicts an example of share single 2 input connector partially-equipped sharing architecture according to one embodiment. Cards #0-#1 are active and card #2 is used only for sharing and does not transmit to any medium. In this case, card #2 is the same design as card #0 and card #1 and uses a splitter to provide service to faulted card #0. Because the share single architecture always shares one transmitter from 2 different cards, two sharing cards are needed, which is why card #2 is included to share service. Cards #3, #4, and #5 are filler cards that provide sparing paths. However, these cards do not transmit to any mediums or perform any sparing.

In this case, card #1 shares with card #0 and card #2 shares with card #0. So only one transmitter #A1 of card #1 shares with one medium of card #0. The other medium is serviced by card #2.

When card #0 fails, transmitter #A0 of card #1 and transmitter #A0 of card #2 are used to compensate for the transmitters of card #0. In one embodiment, transmitter #A0 is a "share left" in that card #1 shares to the left and card #2 is a "share right" in that card #2 shares to the right.

For card #1, the path from transmitter #A0 goes through switch 902-3 to splitter 904-1. In this case, the output of switch 902-3 is switched from being connected to the input of switch 902-4 to the input of splitter 904-1. The path continues through input connector 906-3 to input connector 906-2 of card #0. The output of switch 902-2 is switched to input connector 906-2 from transmitter #A1 of card #0. Transmitter #A0 now services medium #2 and medium #3.

For card #2, transmitter #A0 shares for transmitter #A0 of card #0. Switches 902-5 and 902-6 and splitter 904-2 operate in the same manner as described with respect to card #1.

However, the path from splitter 904-2 to card #0 goes through input connectors 906-6-906-12 to input connector 906-1 of card #0. Then, the signal is sent through switch 902-1 whose input is switched to be connected to input connector 906-1. Thus, transmitter #A0 of card #2 is coupled to medium #1.

Share Pair

The following will describe some examples of the share pair architecture. Not all of the examples will be described, but the share pair architecture may be configured in all of those architectures described with respect to the share bi-directional architecture.

Share Pair-Fully Equipped

Figure 13A:
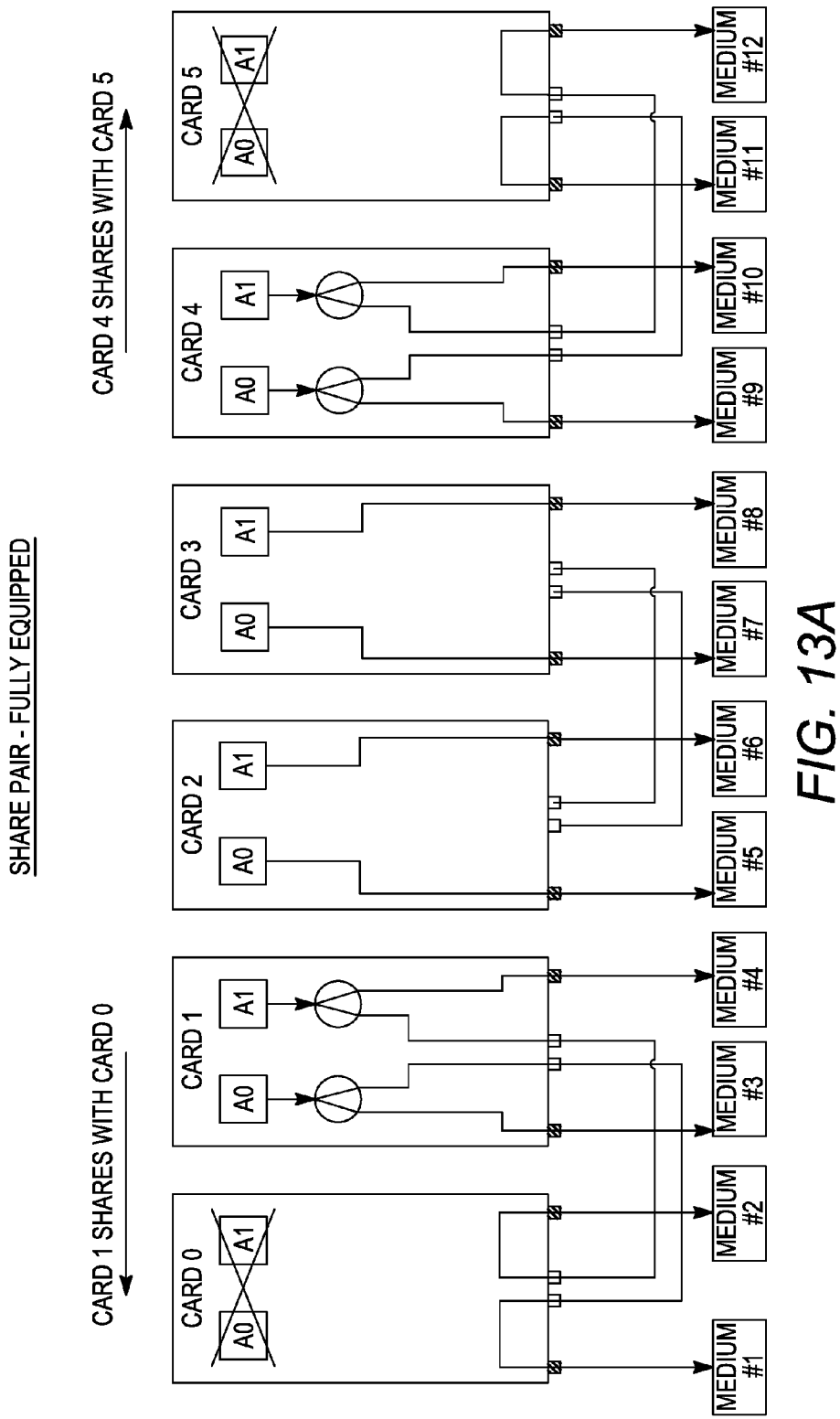
FIG. 13A depicts an example of a share pair fully-equipped architecture according to one embodiment.

FIG. 13A depicts an example of a share pair fully-equipped architecture according to one embodiment. In this example, there are always adjacent single hops with a simple fixed sharing rule. This requires an even number of equipped active cards according to one embodiment. When card #0 and card #5 fail, card #4 shares with card #5 and card #1 shares with card #0. This architecture was discussed with respect to at least FIG. 5D and thus is not described in more detail.

Share Pair-Partially Equipped

Figure 13B:
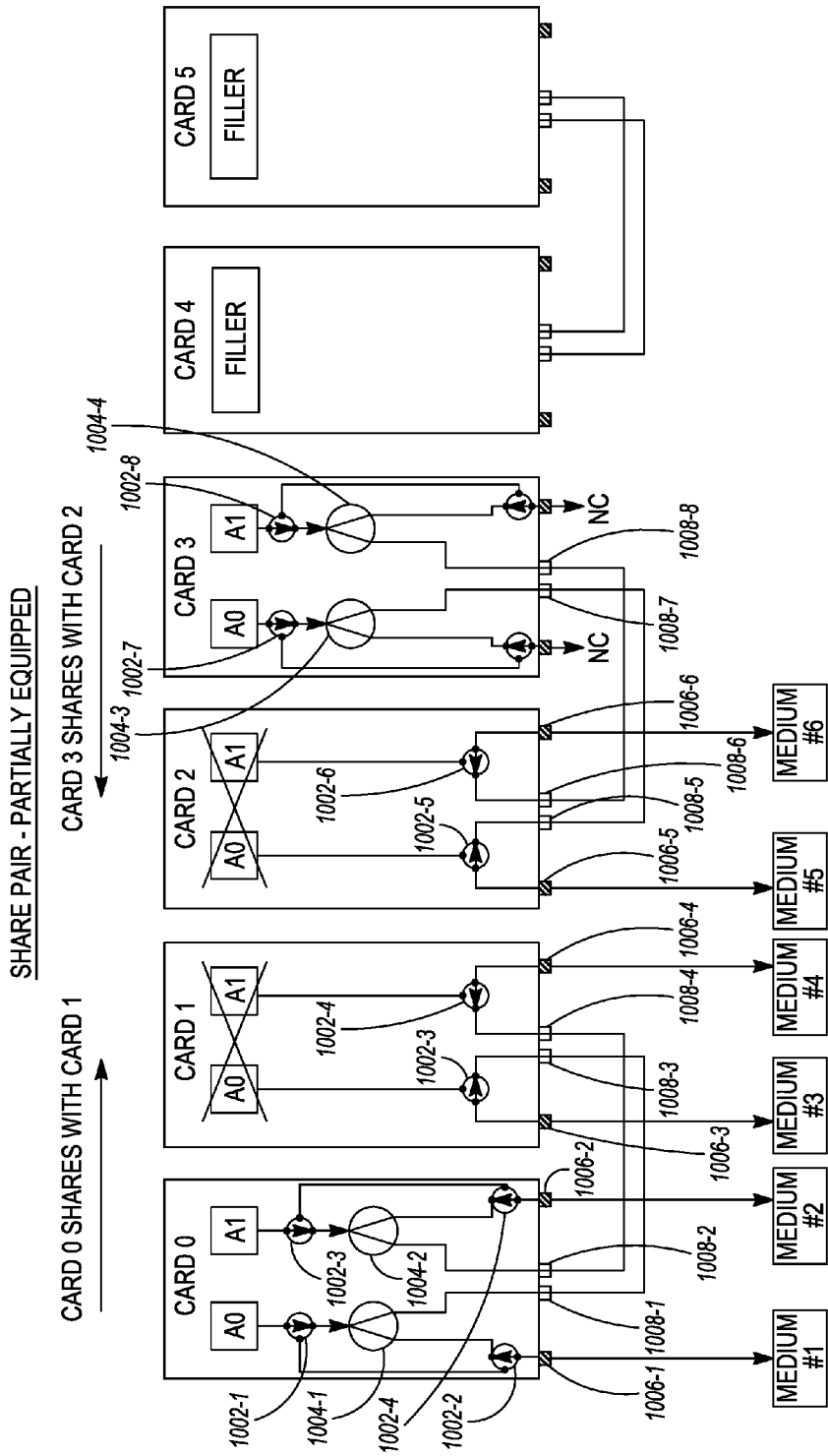
FIG. 13B depicts an example of a share pair partially-equipped chassis architecture according to one embodiment.

FIG. 13B depicts an example of a share pair partially-equipped architecture according to one embodiment. In this example, there are always adjacent single hops (a card next to a failed card is used to compensate for the failure) and a simple fixed sharing rule. This requires an even number of cards that are equipped to transmit. That is why card #3 is included, but is not connected to any medium. Also, card #3 may be the same design as the active cards. This is logistically easier to manage even though the design may not be optimized for this application. This is a sharing card, however, as it includes a splitter. Cards #0-#2 are active cards and card #3 is a sparing card. Cards #0-#2 service mediums #1-#6.

Cards #1 and #2 have failed. In this case, card #0 shares with card #1 and card #3 shares for card #2. Card #3 may be an extra card that has no connections to mediums and is used to compensate for card #2. Card #0 shares with card #1 for the N+0 sparing scheme.

When card #1 fails, transmitters #A0 and #A1 of card #0 compensate for transmitters #A0 and #A1, respectively, for failed card #1. The switching scheme is similar as that described above for the share pair scheme in FIG. 6B. For example, switches 1002-1 and 1002-2 are switched such that splitter 1004-1 is coupled to an output connector 1006-1 and an input connector 1008-1. Transmitter #A0 of card #0 is connected to input connector 1008-3 through input connector 1006-1. Input connector 1008-3 is coupled to switch 1004-3, which has its input switched to input connector 1008-3. This connects transmitter #A0 of card #0 to output connector 1006-3 of card #1. Transmitter #A0 of card #0 now services medium #1 and medium #3.

Similarly, for transmitter #A1 of card #0, switch 1002-3 is switched to connect its output to splitter 1004-2. Switch 1002-4 connects transmitter #A1 of card #0 to output connector 1006-2. Also, input connectors 1008-2 and 1008-4 connect the output of splitter 1004-2 to output connector 1006-4 through switch 1002-4, which has its input connected to output connector 1008-4. This causes transmitter #A1 to service medium #2 and medium #4.

For failed card #2, transmitter #A0 and transmitter #A1 are used as spares for transmitter #A0 and transmitter #A1 of card #2, respectively. For example, switches 1002-5 and 1002-6 are changed to couple to splitters 1004-3 and 1004-4, which are connected to output connectors 1006-5 and 1006-6 to input connectors 1008-5 and 1008-6 of card #2 and input connectors 1008-7 and 1008-8 of card #3. Switches 1002-7 and 1002-8 are used in card #3 to perform the sparing. Transmitter #A0 and transmitter #A1 of card #3 thus service medium #5 and medium #6 for card #2.

Share Right

The following will describe some examples of the share right architecture. Not all of the examples will be described, but the share right architecture may be configured in all of those architectures described with respect to the share bi-directional architecture.

Share Right-Fully Equipped

Figure 14A:
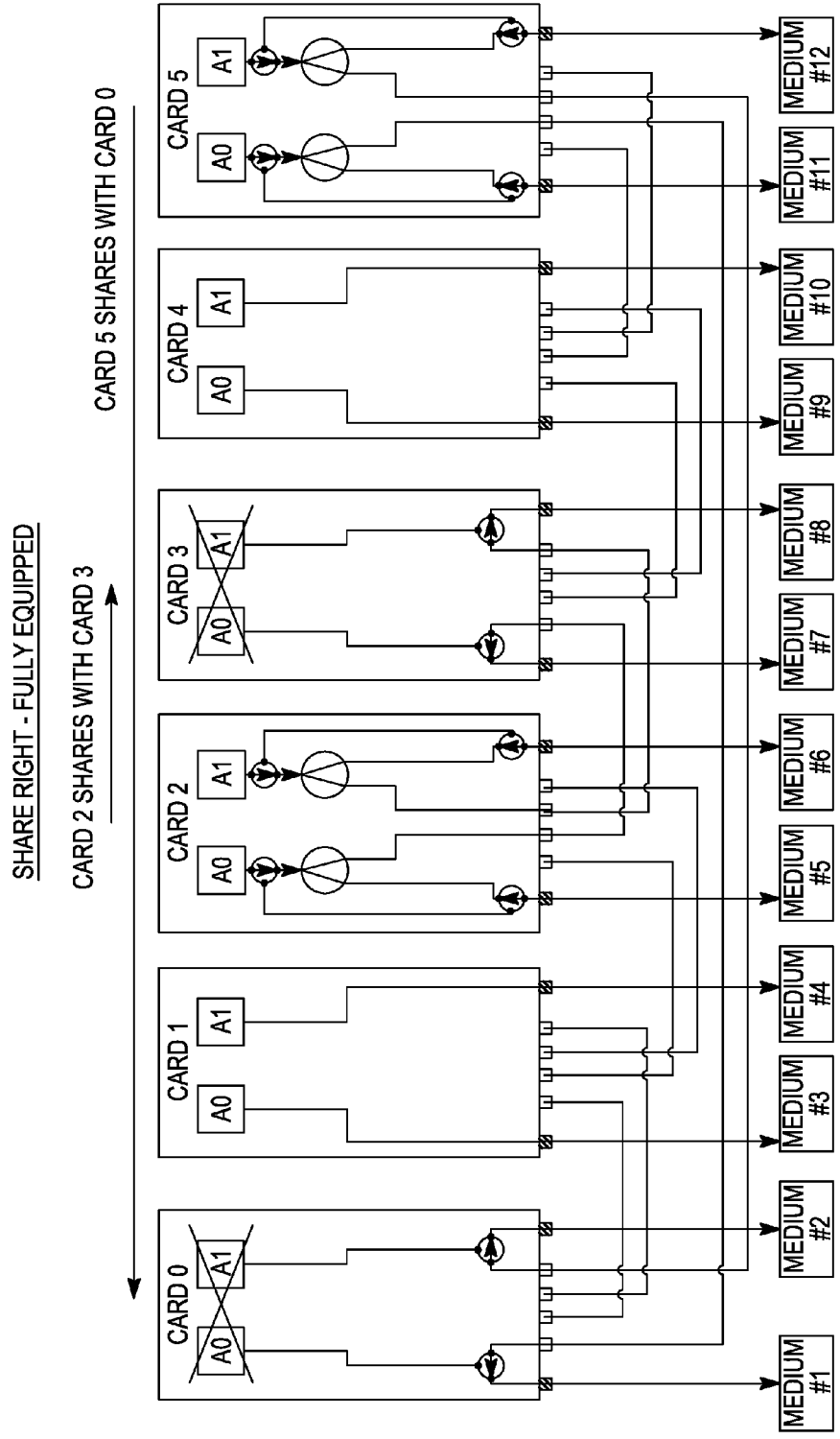
FIG. 14A depicts an example of a share right fully-equipped architecture according to one embodiment.
Figure 14B:
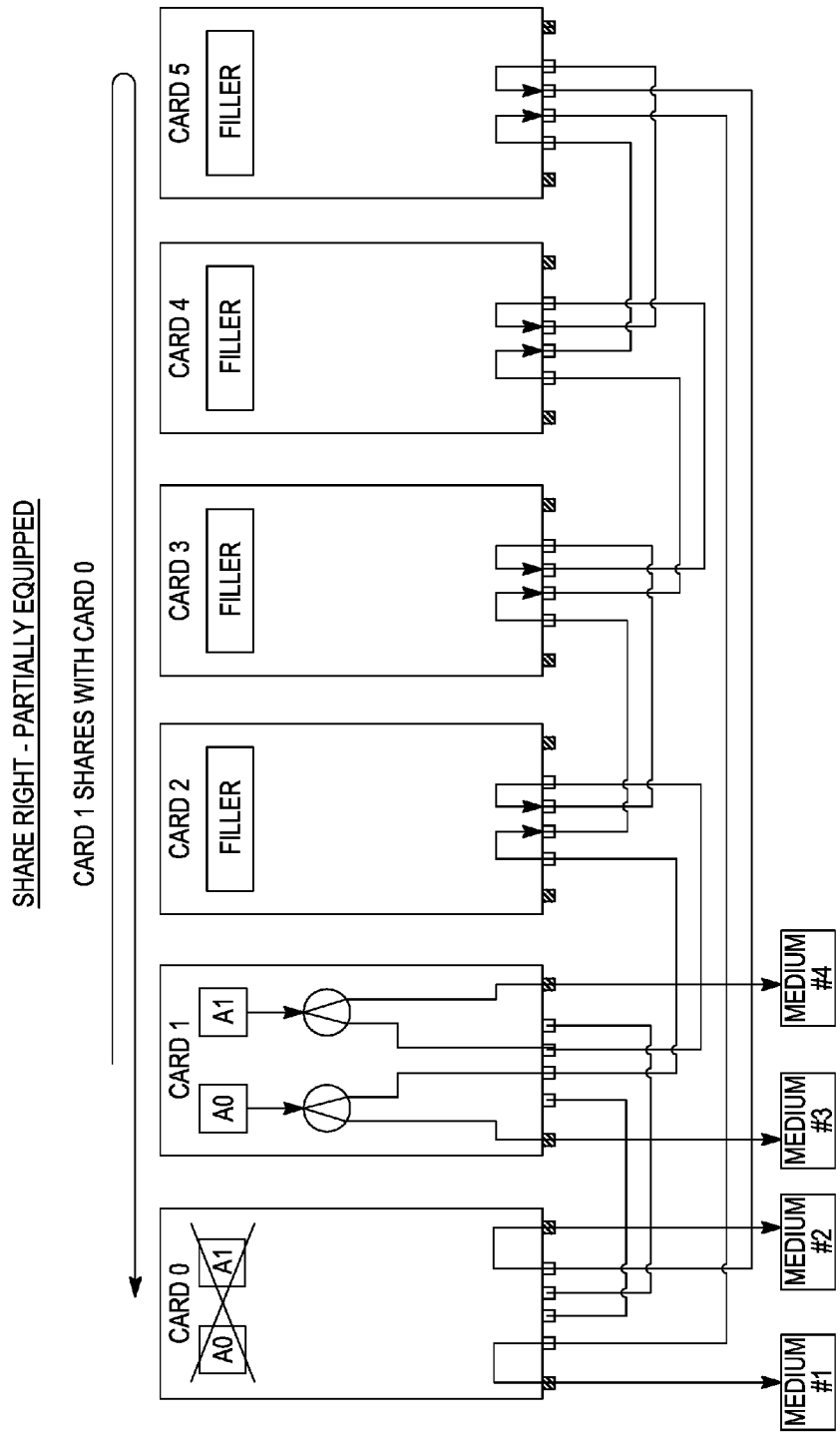
FIG. 14B depicts an example of a share right partially-equipped architecture according to one embodiment.

FIGS. 14A and 14B depict share right architectures according to one embodiment. FIG. 14A depicts an example of a share right fully-equipped architecture according to one embodiment. In this case, only one card is sharing for another card. This always requires four input connectors because two input connectors need to be used to share with the right card when the right card fails and two input connectors need to be used to share with the left card when the card fails.

In this example, card #2 shares with card #3 and card #5 shares with card #0. Thus, only one card is sharing for another card. In this case, card #2 is sharing with card #3 and card #5 shares with card #0. In this case, transmitter #A0 of card #2 is coupled to medium #8 of card #3 and transmitter #A1 of card #2 is coupled to medium #7. Also, transmitter #A0 of card #5 is coupled to medium #1 and transmitter #A1 of card #5 is coupled to medium #2. This sharing is similar to the sharing as described with respect to at least FIG. 5B and thus is not described in more detail.

Share Right-Partially Equipped

FIG. 14B depicts an example of a share right partially-equipped architecture according to one embodiment. In this case, only one card is sharing for another card. This also requires four input connectors according to one embodiment. In this case, card #1 shares with card #0. Cards #2-#5 are fillers. Transmitter #A0 of card #1 compensates for a failed transmitter #A0 of card #0. Also, transmitter #A1 of card #1 compensates for a failed transmitter #A1 of card #0. In this instance, inputs connectors for cards #2-#5 are used to route the signal from transmitter #A1 of card #1 to card #0. This sharing is similar to the sharing as described with respect to FIG. 5B and thus is not described in more detail.

Share/Spare Architecture

FIGS. 15A-15H depict an example of the share/spare bi-directional 2 input connector architecture according to one embodiment. In this architecture, a single card design may be used as a share card or a spare card depending on the switching configuration of the card. For a card to be capable of operating as a share and a spare, extra circuitry is needed. For example, extra switching is needed to switch from a spare configuration to a share configuration where a splitter is needed for the share configuration.

FIG. 15A depicts the functional view of a normal card and FIG. 15B depicts the switch view of a normal card according to one embodiment. In this case, controller 108 switches switch 2002-1 to the N output and switch 2002-2 to the N output to couple transmitter #A0 to output connector 2004-1. The same is true for switch 2002-3 and switch 2002-4 to couple transmitter #A1 to output connector 2004-2. Also, an input connector 2006-1 and an input connector 2006-2 are coupled together through switch 2002-5 and switch 2002-6. This connectivity is only to allow a card while in the normal configuration to be in between a sparing card and a failed card.

FIG. 15C depicts a functional view of a sharing architecture according to one embodiment. In this case, transmitter #A0 is coupled to splitter 2008-1, which feeds output connector 2004-1 and input connector 2006-1. Also, transmitter #A1 is coupled to splitter 2008-2, which is connected to input connector 2006-2 and output connector 2004-2.

FIG. 15D depicts an example of the switch view of the sharing architecture according to one embodiment. In this case, controller 108 switches switch 2002-1 to the Sh output. Further, the inputs of switches 2002-2 and 2002-5 are switched to the Sh input. This couples splitter 2008-1 to output connector 2004-1 and input connector 2006-1. A similar configuration is found for transmitter #A1 and switches 2002-3, 2002-4, and 2002-6 through splitter 2008-2. Transmitter #A1 is thus coupled to input connector 2006-2 and output connector 2004-2. The card has now been configured to share.

FIG. 15E depicts a functional view of a faulted card according to one embodiment. In this case, input connector 2006-1 is coupled to output connector 2004-1 and input connector 2006-2 is coupled to output connector 2004-2.

FIG. 15F depicts the switch view for this architecture according to one embodiment. In this case, switches 2002-2, 2002-5, 2002-6 and 2002-4 are switched to the F input and connect input connector 2006-1 to output connector 2004-1 and input connector 2006-2 to output connector 2004-2.

FIG. 15G depicts a functional view for the sparing architecture according to one embodiment. In this case, the spare is coupled to input connectors 2006-1 and 2006-2. There are no connections to any medium for the spare. The card has now been configured to spare and not share.

FIG. 15H depicts the switch view for the sparing architecture according to one embodiment. In this case, controller 108 switches the output of switch 2002-1 to the Sp output. Also, controller 108 switches the input of switch 2002-5 to the Sp input. This couples transmitter #A0 to input connector 2006-1. The same is true for switches 2002-3 and 2002-6 to couple transmitter #A1 to input connector 2006-2.

Upstream Examples

Figure 16A:
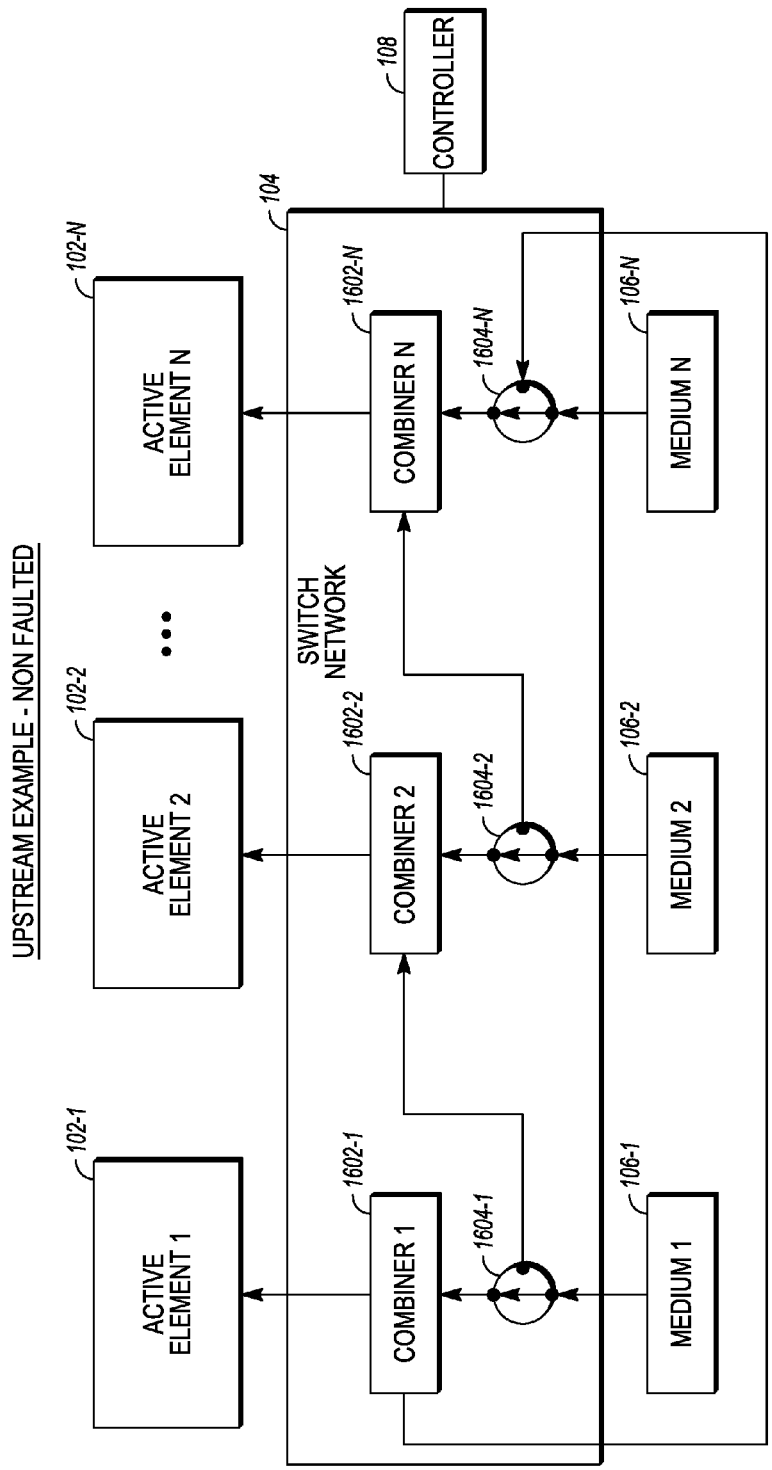
FIG. 16A depicts an example of an N+0 sharing architecture using combiners in the upstream direction according to one embodiment.
Figure 16B:
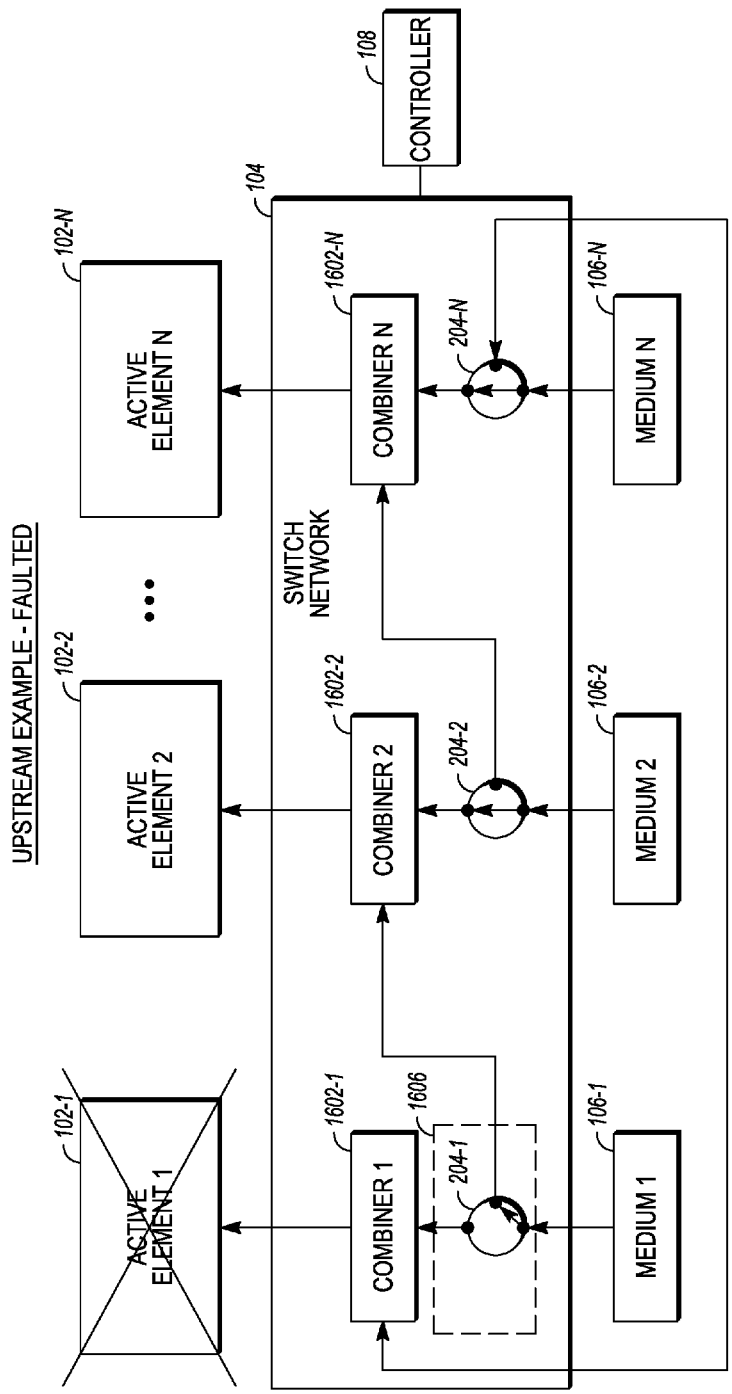
FIG. 16B depicts an example of a switch network in the upstream direction when a failure occurs according to one embodiment.

FIGS. 16A and 16B show upstream examples according to one embodiment. The upstream version replaces splitters with combiners and transmitters with receivers. A combiner combines signals from two mediums permits a single receiver to receive signals from both of them.

FIG. 16A depicts an example of an N+0 sharing architecture using combiners in the upstream direction according to one embodiment. Switch network 104 includes combiner #1 1602-1, combiner #2 1602-2, . . . combiner #N 1602-N and switches #1-N 1604-1-1604-N. In this example, there is no dedicated spare that is capable of taking over for a failed active element.

At this time, there has not been a failure. Thus, active element #1 is connected to medium #1 through combiner 1602-1 and switch 1604-1. Further, the other active elements are connected to respective mediums, such as active element #2 is connected to medium #2 through combiner 1602-2 and switch 1604-2.

FIG. 16B depicts an example of switch network 104 in the upstream direction when a failure occurs according to one embodiment. In this case, active element #1 has failed.

To compensate for the failure, active element #2 receives signals from both medium #1 and medium #2. To perform the sharing, controller 108 reconfigures switch network 104. For example, the input of switch 204-1 is switched from a first position connected to combiner 1602-1 and active element #1 to a second position that is connected to combiner 1602-2. This change is shown in dashed box 1606. This connects medium #1 and medium #2 to active element #2 through combiner 1602-2.

Optical Examples

Figure 17A:
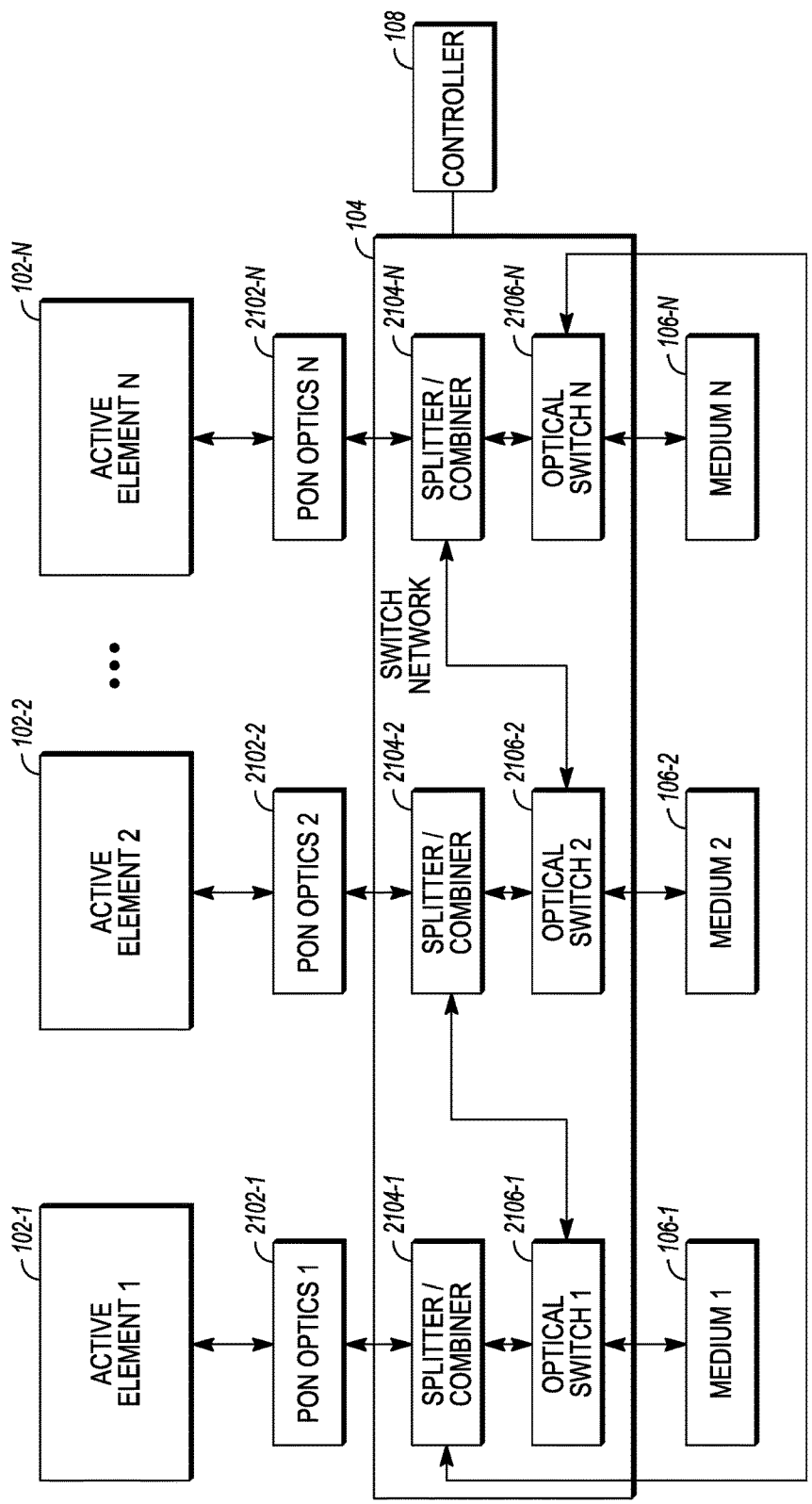
FIG. 17A depicts a first example of an optical sharing architecture according to one embodiment.
Figure 17B:
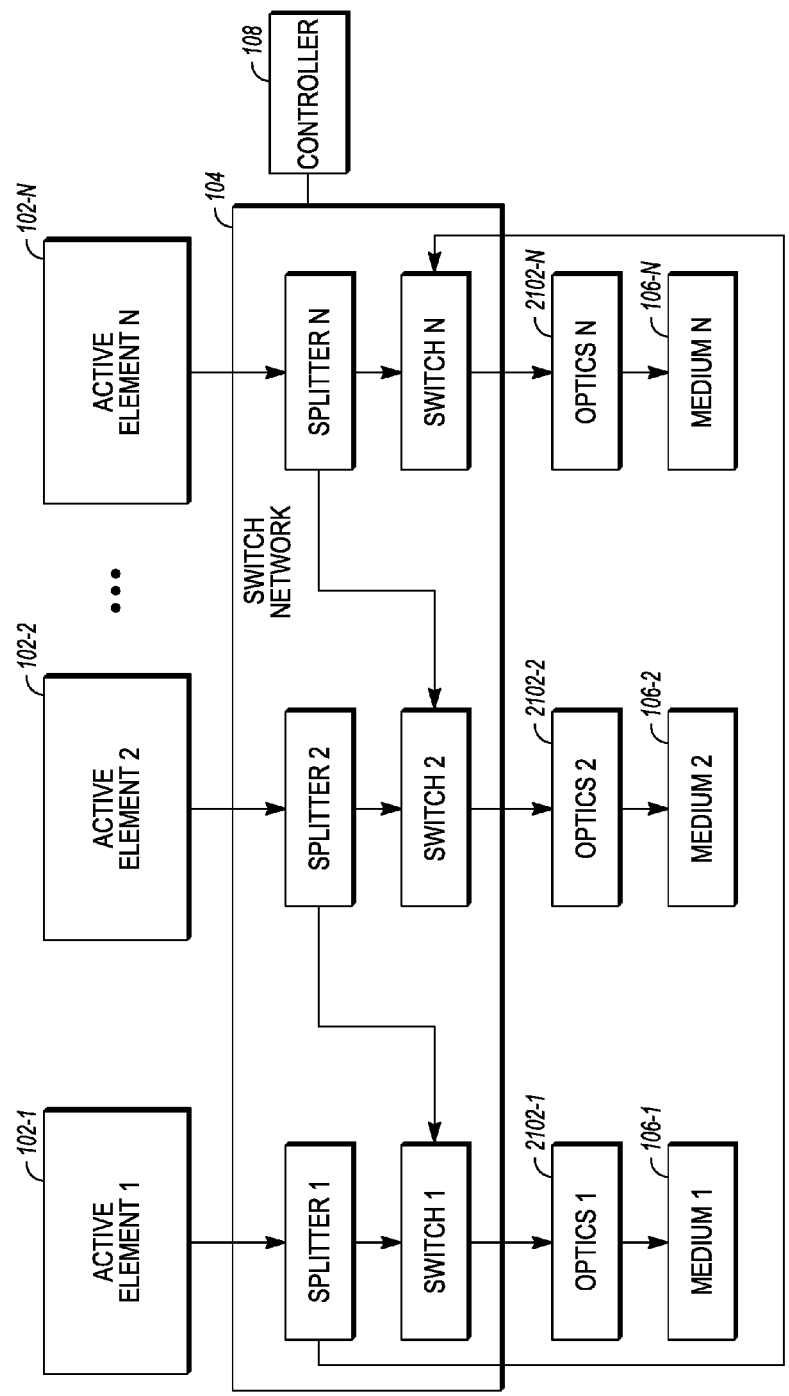
FIG. 17B depicts a second example of an optical sharing architecture according to one embodiment.

FIGS. 17A and 17B depict an example of a sharing architecture using optical components according to one embodiment. FIG. 17A depicts a first example of an optical sharing architecture according to one embodiment. It also shows simultaneous forward and reverse signal flow through the same paths. Switch network 104 includes passive optical network (PON) optics 2102-1-2102-N, which may be optical equipment including transmitters and receivers. Also, switch network 104 includes optical splitters 2104-1-2104-N, which simultaneously function as optical combiners and optical switches 2106-1-2106-N. Optical splitters/combiners 2104-1-2104-N and optical switches 2106-1-2106-N operate similarly to the splitters and switches described above, such as FIGS. 2A and 2B. In this embodiment, the splitting and switching is performed after the output of the optics in the system. This protects the active element and PON optics.

FIG. 17B depicts a second example using switch network 104 and optical components according to one embodiment. In this embodiment, switch network 104 is an electrical switch network and operates as described above to perform sharing. The output to the mediums is through optics #1-N.

Method Flow

Figure 18:
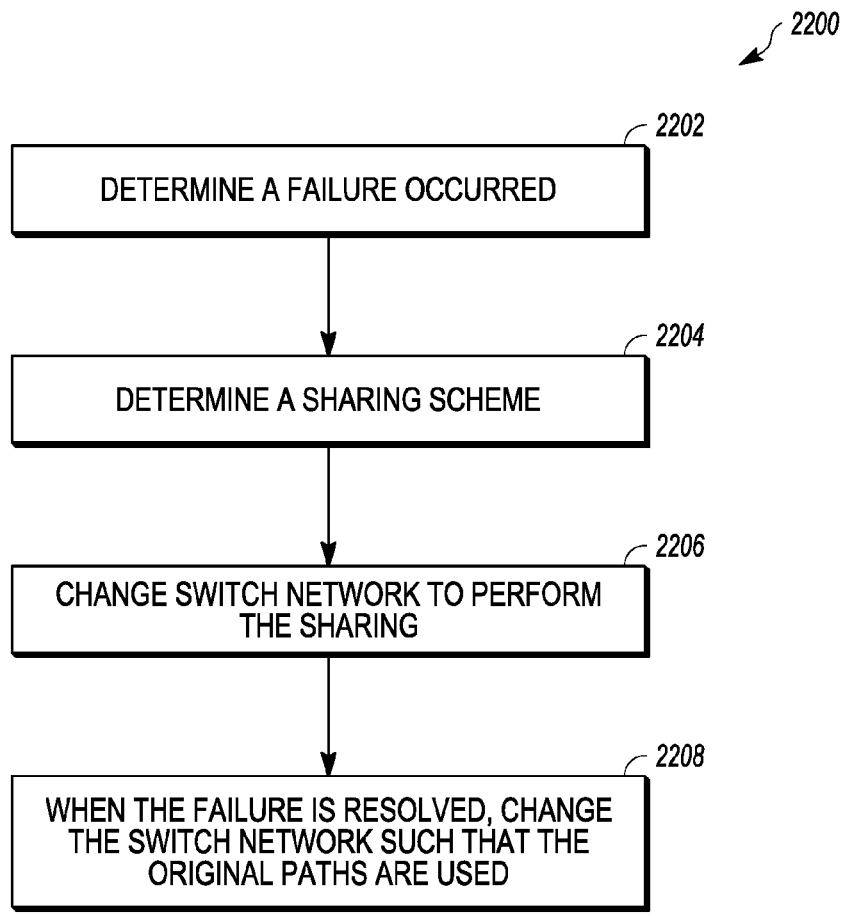
FIG. 18 depicts a simplified flowchart of a method for performing sharing in the distribution network that includes a plurality of active elements coupled to a plurality of mediums according to one embodiment.

FIG. 18 depicts a simplified flowchart 2200 of a method for performing sharing in distribution network 100 that includes a plurality of active elements coupled to a plurality of mediums according to one embodiment. At 2202, controller 108 determines a failure occurred. The failure is to an active medium.

At 2204, controller 108 determines a sharing scheme. The sharing scheme may include any of the schemes described above. In one embodiment, controller 108 analyzes real-time conditions to determine the sharing scheme to use. For example, available bandwidth or congestion for other active mediums are analyzed to determine the best sharing scheme. In other embodiments, the sharing scheme may be hard-coded to compensate for failures.

Then, at 2206, controller 108 changes switch network 104 perform the sharing. Now, at least one active element is sharing service with multiple service groups. At 2208, when the failure is resolved, controller 108 changes switch network 104 such that the original paths are used.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
before a failure, providing service from a plurality of active elements to a plurality of mediums through a switch network, wherein a first active element in the plurality of active elements is connected to a first medium in the plurality of mediums through a first path and a second active element in the plurality of active elements is connected to a second medium in the plurality of mediums through a second path;
detecting a failure in the first active element; and configuring the second path to connect the second active element to the first medium and the second medium through a connection element, wherein the second active element services the first medium and the second medium,
wherein:
the connection element comprises a first connection element,
a first switch is switched to connect to the first connection element from a second connection element that is connected to the first active element, and
a second switch is connected to the first connection element,
the first path is from the first active element through a third switch and the first switch to the first medium, and
the second path is from the second active element through a fourth switch, the first connection element, and the second switch to the second medium, and the second path is from the second active element through the fourth switch, the first connection element, and the first switch to the first medium.

2. The method of claim 1, wherein:
the connection element comprises a splitter, combiner, or a combination of the splitter and combiner.

3. The method of claim 1, wherein:
the first active element is no longer connected to the first medium via the first path.

4. The method of claim 1, wherein:
the second path is from an amplifier to the first connection element, wherein the amplifier amplifies a signal from the second active element to the first medium and the second medium.

5. The method of claim 1, further comprising:
detecting a failure of a third active element that transmits to a third medium in the plurality of mediums through a third path; and
configuring a fourth path from a fourth active element of the plurality of active elements to connect the fourth active element to the third medium, wherein the fourth path connects the fourth active element to a fourth medium and the fourth active element services the third medium and the fourth medium
wherein the first active element and the third active element are in a first structure, and the second active element and the fourth active element are in a second structure.

6. The method of claim 1, wherein the first active element is in a first structure and the second active element is in a second structure, the method further comprising:
detecting a failure of a third active element in the first structure that transmits to a third medium in the plurality of mediums through a third path; and
configuring a fourth path from a fourth active element of the plurality of active elements in a third structure to connect the fourth active element to the third medium, wherein the fourth path connects the fourth active element to a fourth medium and the fourth active element services the third medium and the fourth medium.

7. The method of claim 1, wherein the first active element is in a first structure and the second active element is in a second structure, the method further comprising:
detecting a failure of a third active element in the first structure that transmits to a third medium in the plurality of mediums through a third path; and
configuring a fourth path from a fourth active element of the plurality of active elements in a third structure to connect the fourth active element to the third medium, wherein the fourth path connects the fourth active element to a fourth medium and the fourth active element services the third medium and the fourth medium, wherein the fourth active element in the third structure is in a same position with respect to a fifth active element in the third structure as the second active element is with respect to a sixth active element in the second structure.

8. The method of claim 1, wherein the first active element is in a first structure and the second active element is in a second structure, the method further comprising:
detecting a failure of a third active element in the first structure that connects to a third medium in the plurality of mediums through a third path;
configuring the second active element to connect to the first medium and the third medium; and
configuring a fourth path from a fourth active element of the plurality of active elements in the second structure to connect the fourth active element to the second medium and a fourth medium, wherein the second active element previously was connected to the second medium.

9. The method of claim 1, wherein the first active element is in a first structure and the second active element is in a second structure, the method further comprising:
configuring the first structure and the second structure as a share pair such that the first active element is in one of the first structure and the second structure and the second active element is in the other of the first structure and the second structure and the second active element services the first medium and the second medium when the failure in the first active element is detected and a third active element in the other of the first structure and the second structure services a third medium and a fourth medium when a failure of a fourth active element in the one of the first structure and the second structure is detected.

10. An apparatus comprising:
a plurality of slots in the apparatus;
a plurality of structures inserted in at least a portion of the plurality of slots, each structure providing service to at least two of a plurality of mediums;
a controller configured for:
detecting a failure in a first structure of the plurality of structures that is connected to a first medium and a second medium in the plurality of mediums; and
configuring one or more other structures in the plurality of structures and the first structure to connect the one or more other structures to the first medium and the second medium, wherein the one or more other structures also service a third medium and a fourth medium, wherein the first structure includes a first active element that services the first medium and a second active element that services the second medium before detecting the failure, the one or more other structures includes a second structure that includes a third active element that services a third medium and a fourth active element that services a fourth medium before detecting the failure, and at least one of the third active element and the fourth active element is used to service at least one of the first medium and the second medium after detecting the failure.

11. The apparatus of claim 10, further comprising:

a switch network that includes one or more connection elements to configure the one or more other structures to the first medium, the second medium, the third medium, and the fourth medium.

12. The apparatus of claim 10, wherein:

one or more other structures includes a third structure that includes a fifth active element that services a fifth medium and a sixth active element that services a sixth medium before detecting the failure, and at least one of the fifth active element and the sixth active element is used to service at least one of the first medium and the second medium.

* * * * *